(12) United States Patent
Armstrong et al.

(10) Patent No.: US 7,912,164 B2
(45) Date of Patent: Mar. 22, 2011

(54) SYNCHRONIZATION SYSTEM AND METHOD FOR WIRELESS COMMUNICATING NODES

(75) Inventors: Brian S. R. Armstrong, Shorewood, WI (US); Luis R. Pereira, Milwaukee, WI (US); Carlos H. Rentel, Sussex, WI (US)

(73) Assignee: Eaton Corporation, Cleveland, OH (US)

( * ) Notice: Subject to any disclaimer, the term of this patent is extended or adjusted under 35 U.S.C. 154(b) by 1126 days.

(21) Appl. No.: 11/613,406

(22) Filed: Dec. 20, 2006

(65) Prior Publication Data

US 2008/0152046 A1 Jun. 26, 2008

(51) Int. Cl.
*H04L 7/00* (2006.01)
(52) U.S. Cl. ........ 375/354; 375/355; 375/356; 375/357; 375/359; 375/371; 455/502; 455/500; 455/507
(58) Field of Classification Search .................. 375/354, 375/355, 356, 357, 359, 371, 358; 370/328; 455/205, 500, 507, 422, 423, 502
See application file for complete search history.

(56) References Cited

U.S. PATENT DOCUMENTS

| | | | | |
|---|---|---|---|---|
| 6,363,053 | B1 * | 3/2002 | Schuster et al. | 370/230 |
| 2005/0169233 | A1 * | 8/2005 | Kandala et al. | 370/349 |
| 2007/0218931 | A1 * | 9/2007 | Beadle et al. | 455/502 |
| 2008/0227474 | A1 * | 9/2008 | Dick et al. | 455/502 |

OTHER PUBLICATIONS

Brooks, T., "Wireless Technology for Industrial Sensor and Control Networks", Sensors for Industry Conference, Proceedings of the First ISA/IEEE Conference, pp. 73-77, 2001.

Egea-Lopez, E., et al., "Wireless communications deployment in industry; a review of issues, options and technologies", Computers In Industry, vol. 56, pp. 29-52, 2005.

Dzung, D., et al., "Security for Industrial Communication Systems", Proceedings of the IEEE, vol. 93, No. 6, pp. 1152-1177, 2005.

Avizienis, A., et al., "Fundamental Concepts of Dependability", Computing Science, pp. 7-12, 2001.

Chong, C., et al., "Sensor Networks: Evolution, Opportunities, and Challenges", Proceedings of the IEEE, vol. 91, No. 8, pp. 1247-1256, 2003.

Estrin, D., et al., "Next Century Challenges: Scalable Coordination in Sensor Networks", Proceedings of the 5th Annual ACM/IEEE International Conference on Mobile Computing and Networking, pp. 263-270, 1999.

De, P., et al., "Design Considerations for a Multihop Wireless Network Testbed", IEEE Communications Magazine, vol. 43, No. 10, pp. 102-109, Oct. 2005.

(Continued)

*Primary Examiner* — Chieh M Fan
*Assistant Examiner* — Siu M Lee
(74) *Attorney, Agent, or Firm* — Martin J. Moran

(57) ABSTRACT

A system includes first and second wireless nodes having a clock with plural times, a wireless transceiver, and a processor cooperating with the transceiver to transmit and receive packets. The second node transceivers wirelessly communicate with the first or other second node transceivers. The second nodes include a Kalman filter with an output, plural filter gains, and an input representing the difference between: about the time of the clock when a received packet should have ideally been received, and a time when the received packet was actually received as measured by the clock. A circuit provides dynamic adjustment of the filter gains. The Kalman filter output estimates the difference between the time of the receiving node clock and a corresponding one of the times of the transmitting node clock. The second processor cooperates with the Kalman filter output to adjust the times of the receiving node clock.

22 Claims, 12 Drawing Sheets

OTHER PUBLICATIONS

Zhao, J., et al., "Understanding Packet Delivery Performance in Dense Wireless Sensor Networks", SenSys '03, Proceedings of the 1st International Conference on Embedded Networked Sensor Systems, 13 pp., 2003.

Woo, A., et al., "Taming the Underlying Challenges of Reliable Multihop Routing in Sensor Networks", Proceedings of the 1st International Conference on Embedded Networked Sensor Systems, pp. 14-27, 2003.

Ganesan, D., et al., "Complex Behavior at Scale: An Experimental Study of Low-Power Wireless Sensor Networks", UCLA Computer Science Technical Report UCLA/CSD-TR, pp. 1-11, 2003.

Cerpa, A., "Temporal Properties of Low Power Wireless Links: Modeling and Implications on Multi-hop Routing", Proceedings of the 6th ACM International Symposium on Mobile ad hoc Networking and Computing, pp. 414-425, 2005.

Ramanjaneyulu, B., et al., "Wireless Sensor Networks in Industrial Automation", IETE Technical Review, vol. 22, No. 2, pp. 139-149, 2005.

Thelen, J., et al., "Radio Wave Propagation in Potato Fields", 1st Workshop on Wireless Network Measurements (colocated with WIOpt 2005), 5 pp., 2005.

Reijers, N., at al., "Link Layer Measurements in Sensor Networks", Mobile Ad-hoc and Sensor Systems, 2004 IEEE International Conference on Mobile Ad-hoc and Sensor Systems, pp. 224-234, 2004.

Aguayo, D., et al., "Link-level Measurements from an 802.11b Mesh Network", ACM SIGCOMM Computer Communication Review, vol. 34, No. 4, pp. 121-131, 2004.

Cerpa, A., et al., "SCALE: A Tool for Simple Connectivity Assessment in Lossy Environments", Center for Embedded Networked Sensing, UCLA, Tech. Rep., vol. 21, pp. 1-16, 2003.

De, P., et al, "MINT: A Miniaturized Network Testbed for Mobile Wireless Research", Proc. of Infocom. 2005, Miami, FL, 12 pp., 2005.

Welsh, E., et al., "Gnomes: A Testbed for Low Power Heterogeneous Wireless Sensor Networks", Circuits and Systems, 2003, Proceedings of the 2003 International Symposium, vol. 3, 4 pp., 2003.

Li, S., et al., "A Wireless Sensor Network Testbed Supporting Controlled In-building Experiments", Proc. of the 12th Intl. Conference Sensor, 6 pp., 2005.

Elson, J., et al., "Fine-Grained network time synchronization using reference broadcast", Proceedings of the 5th Symposium on Operating Systems Design and Implementation, pp. 147-163, 2002.

Werner-Allen, G., et al, "MoteLab: A Wireless Sensor Network Testbed", Fourth International Symposium on Information Processing in Sensor Networks, 6 pp., 2005.

Leferink, F., et al., "Reduction of Radiated Electromagnetic Fields by Removing Power Planes", Electromagnetic Compatibility, 2004 International Symposium, vol, 1., pp. 226-230, 2004.

Krishnamurthy, L., "Design and Deployment of Industrial Sensor Networks: Experiences from a Semiconductor Plant and the North Sea", SenSys, '05: Proceedings of the 3rd Intl. Conf. on Embedded Networked Sensor Systems, ACM Press (New York, NY), 12 pp., 2005.

Willig, A., et al., "Measurements of a Wireless Link in an Industrial Environment Using an IEEE 802.11-Compliant Physical Layer", IEEE Transactions on Industrial Electronics, vol. 49. No. 6, pp. 1265-1282, 2002.

Aakvaag, N., et al., "Timing and Power Issues in Wireless Sensor Networks—an Industrial Test Case", International Conference on Parallel Processing Workshops, 8 pp., 2005.

Miaoudakis, A., et al., "Radio Channel Characterization in Industrial Environments and Spread Spectrum Modem Performance", Emerging Technologies and Factory Automation, 10th IEEE Conference, vol. 1, pp. 87-93, 2005.

Kemp, A., et al., "The Impact of Delay Spread on Irreducible Errors for Wideband Channels on Industrial Sites", Wireless Personal Communications, vol. 34, No. 3, pp. 307-319, 2005.

Gersho, A., et al., "Mutual Synchronization of Geographically Separated Oscillators", The Bell System Technical Journal., vol. 45, pp. 1689-1704, 1966.

Sinopoli, B., et al., "Kalman Filtering with Intermittent Observations", IEEE Transactions on Automatic Control, vol. 49, No. 9, pp. 1453-1464, 2004.

* cited by examiner

|  62 | 64 | 66 | 68 |
|---|---|---|---|
| Tx ID | CHANNEL | POWER LVL | PACKET LENGTH |
| 0 | 2 | 0 | 20 |
| 1 | 2 | 1 | 40 |
| 0 | 6 | 1 | 40 |

*FIG.4*

SCHEDULE NODE #0:

| Tx ID | CHANNEL | POWER LVL | PACKET LENGTH |
|---|---|---|---|
| 0 | 2 | 0 | 20 |
| 0 | 2 | 0 | 20 |
| 0 | 2 | 1 | 20 |
| 0 | 2 | 0 | 20 |

SCHEDULE NODE #1:

| Tx ID | CHANNEL | POWER LVL | PACKET LENGTH |
|---|---|---|---|
| 0 | 2 | 0 | 20 |
| 1 | 2 | 0 | 20 |
| 1 | 2 | 1 | 20 |
| 1 | 3 | 0 | 20 |

SCHEDULE NODE #2:

| Tx ID | CHANNEL | POWER LVL | PACKET LENGTH |
|---|---|---|---|
| 0 | 2 | 0 | 20 |
| 0 | 2 | 0 | 20 |
| 0 | 2 | 1 | 20 |
| 0 | 2 | 0 | 20 |

SCHEDULE NODE #3:

| Tx ID | CHANNEL | POWER LVL | PACKET LENGTH |
|---|---|---|---|
| 0 | 2 | 0 | 20 |
| 0 | 2 | 0 | 20 |
| 0 | 2 | 1 | 20 |
| 1 | 3 | 0 | 20 |

*FIG.5*

MyNodeID: 6;  Date and Time: 01/02/2007  19:03:31
μTickStar=423;  RxIntDelayOffset=5;  RxIntBitsPerμTick;8;  sizeof(RingElement)=63
P1 =155 P1a=123  P2 =172 P2a=123  (246) Multiplier=2  μTicksPerPick=819
Power Levels:   31  19  11   7
Packet Lengths: [ 20  40  60  80] , MinPacketLength: 20
NScheduleRows: 1032,  NScheduleRepetitions: 1000000000
NConfigParams Read: 21

```
    142 144 146 148 150 152    154        156            160      164 178 180
tp  Srp SRow μT  St  BG  Tx Ch Pw Ln  Vr  ID ..Srp SRow. SB ...Hrng Hsty.... OFF THE AIR ........ Filler .......... RS  LQ Csum
                            ╰158╯        ╰162    166 168 170 172 174                     176
S  8B8 F5   0  01  E1   3  E  0  14  01  03  08  B8  00  F5  7F  00  00  00  00  20  00  0C  00  15  ED  FF  E6  06  7E  7F  C4  16 ...
T  8B8 F6  191 00  A3   6  E  2  14  01  06  08  B8  00  F6  7F  00  00  00  00  00  00  0C  00  15  ED  FF  E6  06  7E  7F  3B ...
S  8B8 F7   0  00  2B   4  E  1  3C  01  04  08  B8  00  F7  7F  00  00  00  00  00  00  0C  00  0E  0F  10  11  12  13  14  15  16 ...
S  8B8 F8   0  00  04   1  E  2  14  01  01  08  B8  00  F8  7F  00  00  00  00  00  00  0C  00  15  ED  FF  E6  06  7E  7F  0D ...
S  8B8 F9   0  80  04   3  E  0  14  01  03  08  B8  00  F9  7F  00  00  00  00  00  00  0D  00  15  ED  FF  E6  06  7E  7F  6B ...
S  8B8 FA   0  00  24   5  E  2  3C  01  05  08  B8  00  FA  7F  00  00  00  00  08  00  0D  00  0E  0F  10  11  12  13  14  15  16 ...
r  8B8 FA  1EB 00  F5   5  E  2  3C  01  05  08  B8  00  FA  7F  00  00  00  00  00  00  0D  00  0E  0F  10  11  12  83  03  05  1D ...
S  8B8 FB   0  00  FF   4  E  4  3C  01  04  08  B8  00  FB  7F  00  00  00  00  00  00  0E  00  00  00  FF  B6  00  00  00  00  ...
...
R  8B8 10A 1A7 00  E7   0  E  0  14  01  00  08  B8  01  0A  3F  00  00  00  00  00  00  00  00  00  00  00  00  00  F2  EB  73
```
                                                                                ╲140

FIG.11

```
for (jRank = 1; jRank < N_SYNC_RANK_FILTERS; ++jRank)
{
    if ( ( (MySyncRank < jRank) || (RxSyncRank >= 0) && (RxSyncRank < jRank)) )
    {
        SyncRankFilter[jRank] = TWO_15;
    } else {
        SyncRankFilter[jRank] = SyncRankFilter[jRank] - SyncRankFilter[jRank] /TWO_10;
    }
}
if (SyncRankFilter[1] > TWO_14)
    MySyncRank = 1;
else if (SyncRankFilter[2] > TWO_14)
    MySyncRank = 2;
else
    MySyncRank = 3;
```

FIG. 15

SYNCHRONIZATION SYSTEM AND METHOD FOR WIRELESS COMMUNICATING NODES

This invention was made with Government support under DOE Cooperative Agreement No. DE-FC26-04NT42071 awarded by DOE. The Government has certain rights in this invention.

CROSS-REFERENCE TO RELATED APPLICATIONS

This application is related to commonly assigned, concurrently filed:

U.S. patent application Ser. No. 11/613,337, filed Dec. 20, 2006, entitled "System And Method For Assessment Of Wireless Communication Performance";

U.S. patent application Ser. No. 11/613,300, filed Dec. 20, 2006, entitled "System And Method Employing Wireless Communications And Predetermined Measurement Functions Of Wireless Nodes For Assessing Wireless Communication Performance"

U.S. patent application Ser. No. 11/613331, filed Dec. 20, 2006, entitled "Packet Sniffer Node And System Including The Same To Assess Wireless Communication Performance".

BACKGROUND OF THE INVENTION

1. Field of the Invention

This invention pertains generally to wireless systems and, more particularly, to systems for synchronizing wireless nodes of a wireless communication network. The invention also pertains to methods for synchronizing wireless nodes of a wireless communication network.

2. Background Information

Wireless sensor networks (WSN) enable cabling reduction, reduced installation times and operation in hazardous settings for many industrial solutions.

In a WSN, dependability metrics (e.g., reliability; availability; safety; security; survivability; maintainability) are related to the architectural choice (e.g., processing resources; wireless technology) and the particular propagation media characteristics of the industrial setting under study, which are known to be assessed via site surveys. In site surveys, the radio frequency (RF) propagation and interference characteristics are measured at the site of a proposed or actual wireless network installation. With this information, the network engineer can identify under-performing wireless links and make the necessary decisions (e.g., MAC/PHY layer selection; node distribution) to meet the required dependability levels. The site survey and, thus, the surveying instrument, must consider not only dependability metrics, but also industrial conditions, in terms of cost, management, resource sharing, experimental control, data analysis, applicability and repeatability, which differ from other residential, academic or commercial environments.

At the plant floor, which typically includes a plethora of metallic surfaces, non-isotropic signal path losses among radios will be created due to reflection, diffraction and scattering. The measured reception rate between two nodes will not necessarily correlate with the distance between the nodes as is widely observed in other wireless measurements. When factors like node hardware platform and EMI generation by existing operational equipment are taken into account, it is simply not possible to reproduce field conditions in the lab.

Correct operation of low-power wireless systems is dependent on the environment in which they operate. Environmental effects that impact correct operation include, for example, path loss, multi-path fading, shadowing, interference and jamming. These environmental effects vary over time, such that a low-power wireless system that functions correctly at the present time may not function correctly in the future.

Assessment of the RF environment is a crucial factor before any wireless network deployment is attempted. It is believed that known methods and instruments are either designed for generic purposes or are optimized for traditional cellular-radio networks. The unique characteristics of low-power and low-cost distributed wireless networks demand methods and instruments that are flexible, scalable, and able to estimate more accurately the actual performance of the WSN before deployment.

Whether or not a packet of information is successfully transmitted from one wireless node to another wireless node is determined by many characteristics of the wireless equipment (e.g., without limitation, antenna design; transmit power; modulation) and also by characteristics of the environment. A site survey for wireless network deployment measures the characteristics of the environment, so that the characteristics of the equipment can be suitably engineered. Typical design goals are low cost, high data capacity and high reliability. Typical design parameters are radio location, network parameters (of which there are many, such as network topology and the logic of retransmit requests) and transmit power. The most important environmental characteristics are the propagation channel, which, when all other things are fixed, determines the strength of signals arriving at the receiver, and interference, which arises with other RF emitters in the environment. The environmental characteristics are substantially site specific. A door being open or closed, or the style of construction (e.g., aluminum studs), or indeed a person standing in a certain location can significantly change the propagation channel characteristics. Similarly, a piece of equipment turned on or uncovered can change the interfering signal strength. In order to choose the design parameters to meet the design goals, it is necessary to know the values of site-specific environmental characteristics. These can either be assigned generic values, with the risk of excess cost or non-performance, or can be measured in a site survey.

There are two known site survey methods. First, there is the use of RF test instruments (such as sources and a spectrum analyzer) to measure the RF environment, such as propagation channel characteristics and interference signals. Second, a wireless communication network is installed and its performance is measured with a communication network that uses a wired backbone.

Many known tools for wireless performance measurement depend on wiring for correct operation. Such wiring typically provides power, and control signals and data logging from/to a central point. However, it is often cumbersome and unsafe to route wires in an existing commercial or industrial environment. For example, an artificial ground plane, such as is created by the control, data or power wiring of known prior systems, can distort the measurements and lead to a false assessment of communication performance.

The known seven-layer ISO/OSI communication model (i.e., Application, Presentation, Session, Transport, Network, Data Link and Physical layers) is a way of representing the several components of a communication system. Each of the seven layers represents more sophisticated actions or services, based on the layers below. Using RF test instruments is a layer 1 (Physical layer) test. Operating a network and measuring its performance is a layer 3 (Network layer) test.

Directly measuring the RF environment (the Physical layer 1 test) is the most commonly used approach. Typically, two or more technicians or engineers are involved, one with a transmitting device and the other with one or more receiving devices that report both the characteristics of the transmitted test signal (providing data to determine the propagation channel characteristics) and presence and characteristics of interference signals. Many known tools for wireless performance measurement have been designed to be operated by trained technical personnel, or even by network engineers who are adapting the wireless network design at the same time that the testing tool (possibly itself a wireless network) is being configured to operate correctly.

Direct measurement of the RF environment has several disadvantages: (1) the effort is intensive (trained personnel are required with generally several person-hours of effort per hour of measurement); (2) it is difficult to test many points for many hours; (3) wireless communication performance must be inferred (it is not directly measured); (4) test instruments are relatively expensive (many times more expensive than communication nodes); and (5) test instruments incorporate radios and antennas different from those used in deployed wireless devices.

In some cases, the disadvantages of direct RF measurement can be overcome by installing a network of communicating nodes and measuring the performance during predetermined communication tasks. If it is not difficult to install the communicating nodes, then the manpower requirement may be slight. If there is an adequate mechanism for handling the data, then the network of communicating nodes can operate for an extended period of time and the wireless communication performance is directly measured. Typically, the communicating nodes will not be expensive, particularly if they can be used for many tests. However, operating a communication network to measure communication characteristics has two significant disadvantages. First, the communication network must be operational. Second, the Network layer protocol introduces bias into the measurements.

For a variety of common actions (such as acknowledging the receipt of a packet), networks generate and send control packets, which are separate from and in addition to data carrying packets. Network procedures (protocols) are designed to operate with lost or corrupted packets (e.g., with a variety of timers and counters, if a packet is lost, no acknowledgement comes and the original packet is resent; if an acknowledgement is lost, the packet also is resent; if a packet is corrupted, its re-transmission is requested). If many data-carrying packets are lost, then the network will have low data capacity, which is part of the desired measurement. However, if too many control packets are lost, then the network will cease to function (it is said to collapse). In this case, no measurement is made. A typical rule of thumb is that at least $\frac{1}{3}$ of packets must arrive at their destination to avoid network collapse.

Thus, layer 1 tests can operate under very general circumstances, but are effort intensive and limited in other ways. Layer 3 tests operate only where network communications are relatively good.

In many cases it is desirable to coordinate the actions of communicating devices, which requires synchronization among the devices. There are many prior proposals for synchronizing communicating devices, but these are suited for and often require a medium to high rate of successful delivery of messages for correct operation. In a wireless system, a medium to high rate of successful delivery can correspond, for example, to a packet success rate (PSR) of at least 25%.

In some cases, wireless communicating devices operate with a very low PSR. Additionally, some known systems incorporate a master clock and will not function correctly if communicating devices cannot receive messages from the devices with the master clock.

A Kalman filter is an efficient recursive filter which estimates the state of a dynamic system from a series of incomplete and noisy measurements. For example, in a radar application, where one is interested in tracking a target, information about the location, speed and acceleration of the target is measured with a great deal of corruption by noise at any time instant. The Kalman filter exploits the dynamics of the target, which govern its time evolution, to remove the effects of the noise and get a good estimate of the location of the target at the present time (filtering), at a future time (prediction), or at a time in the past (interpolation or smoothing). The Kalman filter is a pure time domain filter, in which only the estimated state from the previous time step and the current measurement are needed to compute the estimate for the current state. In contrast to batch estimation techniques, no history of observations and/or estimates are required. The state of the filter is represented by two variables: (1) the estimate of the state at time k; and (2) the error covariance matrix (a measure of the estimated accuracy of the state estimate). The Kalman filter has two distinct phases: Predict (process update) and Update (measurement update). The Predict phase uses the estimate from the previous time step to produce an estimate of the current state. In the Update phase, measurement information from the current time step is used to refine this prediction to arrive at a new, (hopefully) more accurate estimate.

There is room for improvement in wireless communication systems in which wireless nodes must be synchronized.

There is also room for improvement in methods for synchronizing wireless nodes of a wireless communication network.

SUMMARY OF THE INVENTION

These needs and others are met by embodiments of the invention, which provide a cost-effective way of synchronizing three or more nodes of a wireless communication network even when necessary packets to perform such synchronization being exchanged between the nodes are not reliable. For example, the system and method may operate with a packet success rate (PSR) of about 0.1%, and, thus, about 99.9% of packets can be lost without losing desired timing accuracy. Such an application places especially challenging demands on synchronization. A synchronization algorithm solves the problem of correctly synchronizing wireless nodes, even if the PSR is very low and some nodes do not receive any packets from the node with the master clock.

In accordance with one aspect of the invention, a system employing a plurality of packets comprises: a first wireless node comprising: a first clock including a plurality of first times, a first wireless transceiver, and a first processor cooperating with the first wireless transceiver to transmit and receive a first set of the packets, the first processor being structured to transmit ones of the first set of the packets at corresponding ones of the first times of the first clock; and a plurality of second wireless nodes, each of the second wireless nodes comprising: a second clock including a plurality of second times, a second wireless transceiver structured to wirelessly communicate with the first wireless transceiver of the first wireless node or with the second wireless transceiver of another one of the second wireless nodes, a second processor cooperating with the second wireless transceiver to transmit and receive a second set of the packets, the second processor being structured to transmit ones of the second set of the packets at corresponding ones of the second times of the second clock, and a filter comprising: a plurality of filter gains, an input representing the difference between a third time and a fourth time, the third time being when a received one of the second set of the packets should have ideally been received by the second wireless transceiver, the third time being about one of the second times of the second clock, the fourth time being when the received one of the second set of the packets was actually received by the second wireless transceiver as measured by the second clock, a circuit structured to provide dynamic adjustment of the filter gains, and an output structured to estimate the difference between the one of the second times of the second clock and: (a) a corresponding one of the first times of the first clock of the first wireless node or (b) a corresponding one of the second times of the second clock of another one of the second wireless nodes, wherein the second processor cooperates with the output of the filter to adjust the second times of the second clock.

As another aspect of the invention, a system employing a plurality of test packets for assessing wireless communication performance comprises: a first master wireless node comprising: a first clock including a plurality of first times, a first wireless transceiver, and a first processor cooperating with the first wireless transceiver to transmit and receive a first set of the test packets, the first processor being structured to transmit ones of the first set of the test packets at corresponding ones of the first times of the first clock; and a plurality of second wireless nodes, each of the second wireless nodes comprising: a second clock including a plurality of second times, a second wireless transceiver structured to wirelessly communicate with the first wireless transceiver of the first master wireless node or with the second wireless transceiver of another one of the second wireless nodes, a second processor cooperating with the second wireless transceiver to transmit and receive a second set of the test packets, the second processor being structured to transmit ones of the second set of the test packets at corresponding ones of the second times of the second clock, and a filter comprising: a plurality of filter gains, an input representing the difference between a third time and a fourth time, the third time being when a received one of the second set of the test packets should have ideally been received by the second wireless transceiver, the third time being about one of the second times of the second clock, the fourth time being when the received one of the second set of the test packets was actually received by the second wireless transceiver as measured by the second clock, a circuit structured to provide dynamic adjustment of the filter gains, and an output structured to estimate the difference between the one of the second times of the second clock and: (a) a corresponding one of the first times of the first clock of the first master wireless node or (b) a corresponding one of the second times of the second clock of another one of the second wireless nodes, wherein the second processor cooperates with the output of the filter to adjust the second times of the second clock.

As another aspect of the invention, a method employing a plurality of packets comprises: transmitting or receiving a first set of the packets by a first master wireless node; employing a first clock including a plurality of first times at the first master wireless node; transmitting or receiving a second set of the packets by a plurality of second wireless nodes; employing a second clock including a plurality of second times at the second wireless nodes; employing a filter including a plurality of filter gains at the second wireless nodes; inputting an input representing the difference between a third time and a fourth time, the third time being when a received one of the second set of the packets should have ideally been received by one of the second wireless nodes, the third time being about one of the second times of the second clock, the fourth time being when the received one of the second set of the packets was actually received by the one of the second wireless nodes as measured by the second clock; providing dynamic adjustment of the filter gains; outputting an output structured to estimate the difference between the one of the second times of the second clock and: (a) a corresponding one of the first times of the first clock of the first master wireless node or (b) a corresponding one of the second times of the second clock of another one of the second wireless nodes; and adjusting the second times of the second clock with the output.

BRIEF DESCRIPTION OF THE DRAWINGS

A full understanding of the invention can be gained from the following description of the preferred embodiments when read in conjunction with the accompanying drawings in which:

FIG. 4 is an example schedule and its entries in accordance with another embodiment of the invention.

FIG. 5 are example schedules in which different schedules are provided to plural nodes in order to test interference in accordance with another embodiment of the invention.

FIG. 11 is a display of example logged data of the data logger of FIG. 3.

FIG. 15 is a diagram showing the Sync Rank algorithm in accordance with an embodiment of the invention.

DESCRIPTION OF THE PREFERRED EMBODIMENTS

Figure 1:
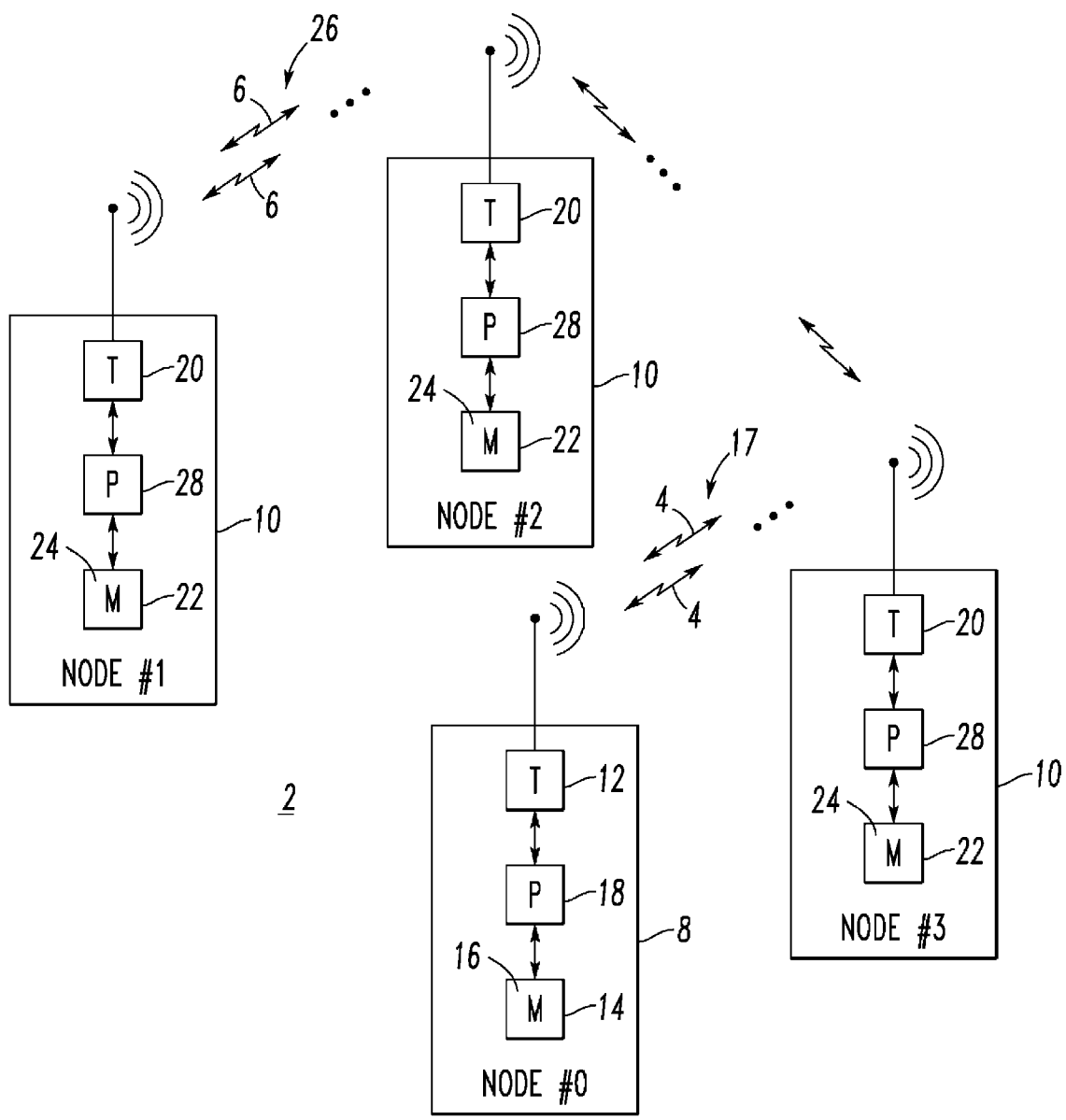
FIG. 1 is a block diagram of a system for assessment of wireless communication performance in accordance with an embodiment of the invention.

As employed herein, the term "clock" means a clock, a crystal oscillator, a timer, or any suitable mechanism that generates timing information.

As employed herein, the term "number" shall mean one or an integer greater than one (i.e., a plurality).

As employed herein, the term "network coordinator" (NC) shall expressly include, but not be limited to, any communicating device, which operates as the central controller in an ad-hoc communication network.

As employed herein, the term "node" shall expressly include, but not be limited by, any processing, logging and/or communicating device (e.g., without limitation, a portable communicating device; a fixed communicating device, such as, for example, switches, motion sensors or temperature sensors as employed in a wireless sensor network), which participates in an ad-hoc communication network.

As employed herein, the term "wireless" shall expressly include, but not be limited by, radio frequency (RF), light, visible light, infrared, ultrasound, wireless area networks, such as, but not limited to, IEEE 802.11 and all its variants (e.g., without limitation, 802.11a; 802.11b; 802.11g), IEEE 802.15 and all its variants (e.g., without limitation, 802.15.1; 802.15.3, 802.15.4), IEEE 802.16 and all its variants, other wireless communication standards (e.g., without limitation, ZigBee™ Alliance standard), HyperLan, DECT, PWT, pager, PCS, Wi-Fi, Bluetooth™, and cellular.

As employed herein, the term "wireless communication network" means a communication network employing wireless communications.

As employed herein, the term "wireless sensor network" means a network comprising spatially distributed autonomous nodes using devices to control outputs and/or sensors to receive inputs that cooperatively sense for example physical or environmental conditions, such as for example and without limitation, light, temperature, sound, vibration, pressure, motion or pollutants, at different locations. Non-limiting examples of wireless sensor networks include a wireless facilities management system or a wireless infrastructure management system employed for environment and/or habitat monitoring, healthcare applications, home automation, commercial lighting control or traffic control. Each node in a wireless sensor network is typically equipped with a radio transceiver or other suitable wireless communication device, a processor (e.g., small microcontroller), and an energy source, such as a battery or a mains-powered energy source.

As employed herein, the term "sensor" means an apparatus structured to input data or information and to output related data or information to a wireless communication network. A sensor may optionally include or be operatively associated with zero or a number of devices. Non-limiting examples of sensors include sensors structured to sense light, switch sensors, motion sensors, temperature sensors, sound sensors, vibration sensors, pollution sensors, current sensors and/or voltage sensors.

As employed herein, the term "device" means an apparatus structured to input data, information or a control command from a wireless communication network or a wired communication network and to output corresponding data, corresponding information or a corresponding control action. A device may optionally include or be operatively associated with zero or a number of sensors. Non-limiting examples of devices include ballasts, lights, power relays, water valves, data collection and/or network bridges.

As employed herein, the term "mains-powered" refers to any node, which has continuous power capabilities (e.g., powered from an AC outlet or AC receptacle or AC power source; AC/DC powered devices; rechargeable battery powered devices; other rechargeable devices), but excluding non-rechargeable battery powered devices.

As employed herein, the term "execute" means to carry out or complete fully, or to attempt to carry out or complete fully. For example, to "execute a schedule" means to fully carry out or complete the schedule, or to attempt to fully carry out or complete the schedule.

As employed herein, the term "set" means a number of things of the same or similar kind.

The invention is described in association with a wireless sensor network, although the invention is applicable to a wide range of wireless communication networks.

Referring to FIG. 1, a system 2 employs a plurality of test packets 4,6 for assessing wireless communication performance. The system 2 includes a first master wireless node 8 (node #0) and a number of second wireless nodes 10 (three example nodes, node #1, node #2 and node #3 are shown, although any suitable number of second wireless nodes 10 may be employed). The first master wireless node 8 includes a first wireless transceiver (T) 12, a first memory (M) 14 storing a first schedule 16 defining transmission and reception of a first set 17 of the test packets by the first wireless transceiver 12, and a first processor (P) 18 cooperating with the first wireless transceiver 12 and the first memory 14 to transmit and receive the first set 17 of the test packets responsive to the first schedule 16. Each of the number of second wireless nodes 10 includes a second wireless transceiver 20 structured to wirelessly communicate with the first wireless transceiver 12 of the first master wireless node 8 or with the second wireless transceiver 20 of another one of the number of second wireless nodes 10, a second memory 22 storing a second schedule 24 defining transmission and reception of a second set 26 of the test packets by the second wireless transceiver 20, and a second processor 28 cooperating with the second wireless transceiver 20 and the second memory 22 to transmit and receive the second set 26 of test packets responsive to the second schedule 24. The first set 17 of test packets that are received by the master wireless node 8 are some of the test packets of the second set 26 that are transmitted by a number of the second wireless nodes 10. The second set 26 of the test packets that are received by a corresponding second wireless node 10 may include some of the test packets of the first set 17 that are transmitted by the master wireless node 8 and/or some of the test packets of the second set 26 that are transmitted by a number of other second wireless nodes 10.

After start up, each of the number of second wireless nodes 10 is initialized and waits to receive a number of the second set 26 of test packets before being synchronized with the second schedule 24 and beginning to receive and transmit the second set 26 of test packets according to the second schedule 24. The second schedule 24 of the second wireless nodes 10 has a number of entries that allows the corresponding node 10 to receive a suitable number of text packets from at least one synchronized node. The first and second processors 18,28 store data from the first and second sets 17,26 of the test packets, respectively. Offline post-processing may be employed to assess wireless communication performance between corresponding ones of the first master wireless node 8 and the number of second wireless nodes 10.

EXAMPLE 1

The disclosed system 2 measures wireless performance and can be used, for example, for wireless network site surveys. The system 2, which is a layer-two test, significantly reduces the cost and increases the information yield of site surveys.

EXAMPLE 2

The system 2 is truly wireless and there is no wired data connection for experiment control and no wired power connection. The system nodes 8,10 operate without any wiring, in order that the nodes can be placed in active industrial settings where wiring is impractical or impossible. Hence, no artificial ground plane is formed among the test nodes 8,10 that could otherwise distort the measurements and lead to a false assessment of communication performance. Furthermore, the system 2 has a relatively very simple operation: (1) place the nodes 8,10 as desired; (2) install the pre-programmed memory 14,22 (e.g., without limitation, compact flash cards); and (3) turn on the nodes 8,10. This operation makes the system 2 attractive for industrial testing.

EXAMPLE 3

Figure 2:
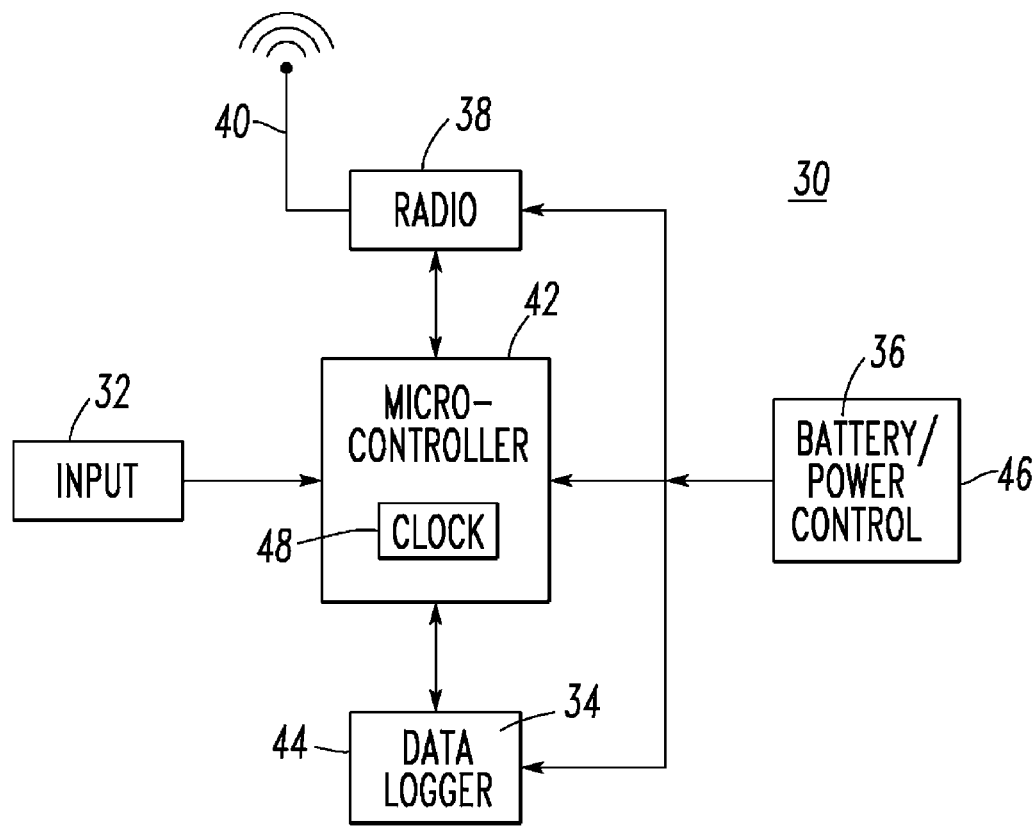
FIG. 2 is a block diagram of a system node in accordance with another embodiment of the invention.

As shown in FIG. 2, each system node 30 of the system 2 (FIG. 1) has a single user input 32 (e.g., button; on/off switch) and it does not matter in what order the nodes are turned on. All configuration information for a test is stored in removable media (e.g., without limitation, a compact flash card 34). The system nodes, such as 30, synchronize and execute the test automatically. If a node is shut down during the test (e.g., to exchange a battery 36 or compact flash card 34; by accident), then when it is turned back on it will automatically rejoin the test. If any node, other than the "master node" 8 (node #0 of FIG. 1) is turned off or disabled, the test continues with no change other than the loss of transmitted packets from the disabled node. The corresponding schedule 16,24 may be transferred from the compact flash card 34 to the memory 14,22 of the corresponding node 8,10.

The system nodes 8,10,30 of FIGS. 1 and 2 can make successful measurements even when the packet success rate is very low. Hence, it is not necessary to place the nodes in special locations. For example, a yellow flashing LED (not shown) indicates that a node is receiving the system test packets, and a green flashing LED (not shown) indicates that the node is communicating with other nodes and participating in the test. The complexity of the system 2 is realized in pre-processing the schedules 16,24 (FIG. 1) and in post-processing the logged data, but not in the operation of the nodes 8,10,30. In this manner, the complex steps of laying out a measurement test plan (pre-processing) or analyzing the results (post-processing) can be done in a central location by trained staff. Simplifying operation even further, a number of standard test plans can be prepared and be available as card sets. Also, for routine site surveys, post-processing can be automated.

The system 2 scans six dimensions that characterize link performance: (1) time; (2) transmitter location; (3) receiver location; (4) channel; (5) transmit power level; and (6) packet size. The system test is controlled by a schedule, such as 16 or 24. Each line in the schedule corresponds to one "tick" of time and typically corresponds to one node transmitting one packet with a specified channel, power level and length. A characteristic of the schedule mechanism is that it is very flexible, for example, sufficiently flexible that either no node, or several nodes can transmit in a given "tick".

EXAMPLE 4

The hardware of the system node 30 (FIG. 2) includes a radio 38 with antenna 40, a micro-controller 42, a data logger 44, and a battery/power control 46 including the battery 36. The radio 38 (e.g., without limitation, Chipcon CC2420 marketed by Texas Instruments of Dallas, Tex.) communicates according to the IEEE 802.15.4 standard (e.g., without limitation, ZigBee™ Alliance). The micro-controller 42 (e.g., without limitation, Atmel AVR mega128 marketed by Atmel Corporation of San Jose, Calif.) is a low-power 8-bit RISC processor. The data logger 44 may be, for example, an Acumen SDR-OEM-CF data logger. A number (e.g., without limitation, 3 or 6 alkaline lantern batteries 36) are employed in conjunction with the power management on the data logger 44.

The particular selection of each hardware component is not an essential part of the system 2. For example, any suitable packet radio technology (e.g., without limitation, IEEE 802.11 (WiFi) networks; the nodes of the upcoming SP100 wireless standard for automation) may be employed. The radio 38 may be replaced with any suitable radio. Similarly, the particulars of the micro-controller 42, data logger 44 and battery/power control 46 are not essential features of the system 2.

EXAMPLE 5

The system nodes 10,30 are preferably identical in terms of hardware and software. Such system nodes are preferably packaged in a water-proof NEMA-4 enclosure (not shown), to prevent hazards from the environment to the device or from the device to critical deployment infrastructures.

EXAMPLE 6

All system nodes, such as 30, have a hardware clock 48 as part of the micro-controller 42. For example, the hardware clock 48 is a 32,768 Hz crystal clock, although any suitable clock and/or frequency may be employed. A single oscillation of the example clock (e.g., about 30.52 µS) is referred to as a "micro-tick". The operational time unit of the system 2 is a "tick". The duration of a tick is uTicksPerTick micro-ticks. For example, when uTicksPerTick is set to 2048, the duration of a tick is about 62.5 mS, giving about 16 ticks per second. In a typical configuration of the system 2, one node, such as 30, transmits one packet each tick.

EXAMPLE 7

Figure 3:
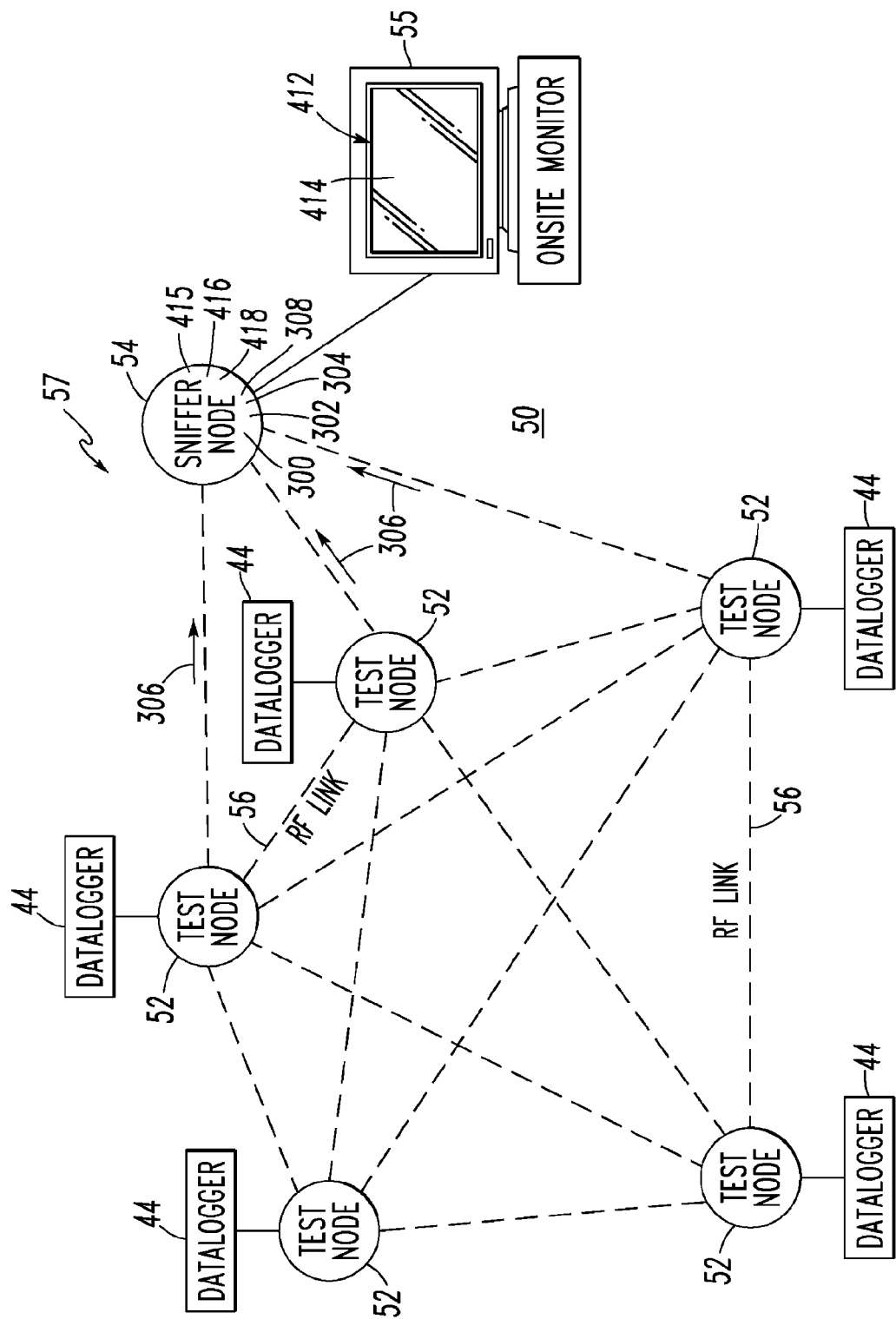
FIG. 3 is a block diagram of a connected system with five nodes and a sniffer node in accordance with another embodiment of the invention.

Another system 50 is shown in FIG. 3. The radio 38, micro-controller 42 and power control 46 of FIG. 2 are collectively shown as a test node 52, each of which includes a corresponding data logger 44. In this example, the system 50 has five nodes 52 and an optional "sniffer node" 54 having a monitor 55. The sniffer node 54 is an optional (i.e., non-essential to the system 50) instrument for observing the operation of the system 50. In FIG. 3, the five example system nodes 52 are each communicating with the other four nodes, and the sniffer node 54 is receiving packets from three of the system nodes 52. An important aspect of the system 50 is that the test will be successful even if only a few of the RF links, such as 56, of a wireless communication network (e.g., wireless sensor network 57) are successfully carrying communication.

In particular, the example sniffer node 54, as shown, includes a wireless radio 300 structured to receive but not to transmit, a memory 302 storing a schedule 304 defining transmission and reception of a plurality of test packets 306 by the wireless nodes 52, and a processor 308 cooperating with the wireless radio 300 and the memory 302 to receive at least some of the test packets 306 responsive to the schedule 304. As will be discussed, the processor 308 is structured to determine whether some of the wireless nodes 52 are synchronized with another one of the wireless nodes 52 (e.g., the master node 8 of FIG. 1). None of the entries of the schedule 304, which may be the same as or similar to the schedule 24 of FIG. 1, indicates the packet sniffer 54. The wireless radio 300 is, for example, a transceiver including a receiver and a transmitter. The sniffer processor 308 enables the receiver and disables the transmitter.

EXAMPLE 8

The systems 2,50 include five subsystems: (1) the schedule, ticks and transmitted packets; (2) control; (3) synchronization; (4) initialization; and (5) logging. As to the schedule, ticks and transmitted packets, in the system 2, the transmission of packets is controlled by a fixed schedule, such as 16 or 24. Each schedule entry corresponds to one schedule row, and the schedule 16,24 has NScheduleRows rows. During a test, the schedule 16,24 is repeated NscheduleRowsPerRepetition times. Example schedule entries 60 are shown in FIG. 4. Each row is an entry and controls the transmission of one test packet. In normal operation, all system nodes 8,10 operate with the same schedule 61 (in this example, the schedules 16,24 are the same). A schedule entry (Schedule Information) indicates the ID number 62 of the node that will transmit, the channel 64 and power level 66 for the transmission, and the packet length 68. The node with the ID number matching the indicated transmit ID (Tx ID 62) prepares to transmit, while all other nodes prepare to receive a packet on the indicated channel 64. All nodes 8,10 in the system 2 are synchronized in order to execute schedule entries 60 in unison. For the system 2, time is divided into "ticks". During each tick, one schedule entry (row) is processed. The control algorithm (not shown) and the synchronization algorithm 92 (FIG. 6) also operate on the basis of ticks.

The schedules 16,24 (FIG. 7) are an important characteristic of the system 2. The schedules 16,24 permit the system 2 to synchronize and execute the test fully automatically, to allow a non-master master node 10 to be turned off or disabled without significantly impacting the test, to make successful measurements even when the packet success rate is very low, to achieve complexity in pre-processing and post-processing rather than in the operation of the nodes 8,10, and to permit the system 2 to scan six dimensions that characterize link performance according to the schedule 16,24. By sticking to simple, rigid schedules 16,24, the control information required for nodes 10 to synchronize with a system test is limited to the schedule row and schedule repetition of each tick. This information is included in each system packet. In this manner, no exchange of distinct control messages is required when a node 10 joins the test.

Unlike known prior systems, the system 2 reduces the required control information to just two values (by use of the fixed schedule) and the inclusion of all required control information in each system packet, in order that no special messages are ever required, and so that a node 10 can synchronize and execute the test upon receiving a suitable number of packets. The test is entirely controlled by the schedules 16,24. Hence, no action by any node 10 is required at any time to indicate the necessary actions of any other node as part of the test. The system 2 employs a single master node 8 that directly or indirectly is the reference for the current row and repetition in the execution of the schedules 16,24. Otherwise, all nodes 10 in the system 2 are equivalent and, in general, none is indispensable.

Because the system 2 operates with a fixed schedule and synchronization, a node 10 needs to receive only a number of packets to determine the schedule row and repetition and to synchronize its local clock 48, and needs only occasionally (e.g., without limitation, about once per 1000 ticks) receive a packet to refresh the synchronization.

While the schedules 16,24 may provide testing for a wide range of wireless attributes which a site survey should measure, they are prepared in pre-processing, and any complexity is not apparent to the on-site operator. As with other site survey tools, an important characteristic of the system 2 is that it can scan in the six dimensions that are important for a site survey. The four parameters 62,64,66,68 of each schedule entry 60 directly control four of the six dimensions. The other two are time, which is naturally sampled as the test evolves, and receiver location. Normally, all nodes 8,10 other than the transmitter will be prepared to receive each test transmission.

A further important aspect of the invention is storing a copy of the schedule 16,24 in each node 8,10. This is contrasted with known prior tools and site survey tools with wired networks for control that require a central controller to issue commands to remote test nodes.

EXAMPLE 9

Normally, all of the system nodes 8,10 operate with the same schedule 16,24. However, by providing different schedules to the several nodes, the system 2 has unique capabilities. For example, in FIG. 5, four different schedules 70,72,74,76 are shown, one for nodes #0, #1, #2 and #3. When executing the first row, node #0 will transmit on channel #2 and nodes #1, #2 and #3 will listen to this channel, with the possibility of receiving the packet. In the second row, however, the schedules differ. Both nodes #0 and #1 will transmit on channel #2, thereby, creating interference, while nodes #2 and #3 receive on channel #2. This is repeated in the third row, although at a reduced power level (e.g., power level #0 is the "highest" power level). The test of rows #2 and #3 explores issues of importance for network deployment, such as the required spatial separation before a channel can be reused. In row #4, a different test is shown. In this case, both nodes #0 and #1 transmit concurrently, but node #0 transmits on channel #2, while node #1 transmits on channel #3. Nodes #2 and #3 listen on channels #2 and #3, respectively, and can detect what is known as "adjacent channel" interference. The use of a distributed schedule and high-precision synchronization are important for being able to conduct interference tests.

EXAMPLE 10

As to control, the system nodes 8,10 operate with fully autonomous distributed control, which means that they can operate correctly without access to either a wired network or reliable wireless communication. Fully autonomous distributed control is important for achieving a wireless system in which it does not matter the order that the nodes 8,10 are turned on, the system 2 synchronizes and executes the test fully automatically, allows a non-master master node 10 to be turned off or disabled without significantly impacting the test, and makes successful measurements even when the packet success rate is very low. A simple way to observe whether there is fully autonomous distributed control in a site survey tool is to isolate one node of the tool during a test. If that node continues to operate correctly, then it is operating under fully autonomous distributed control.

EXAMPLE 11

Figure 6:
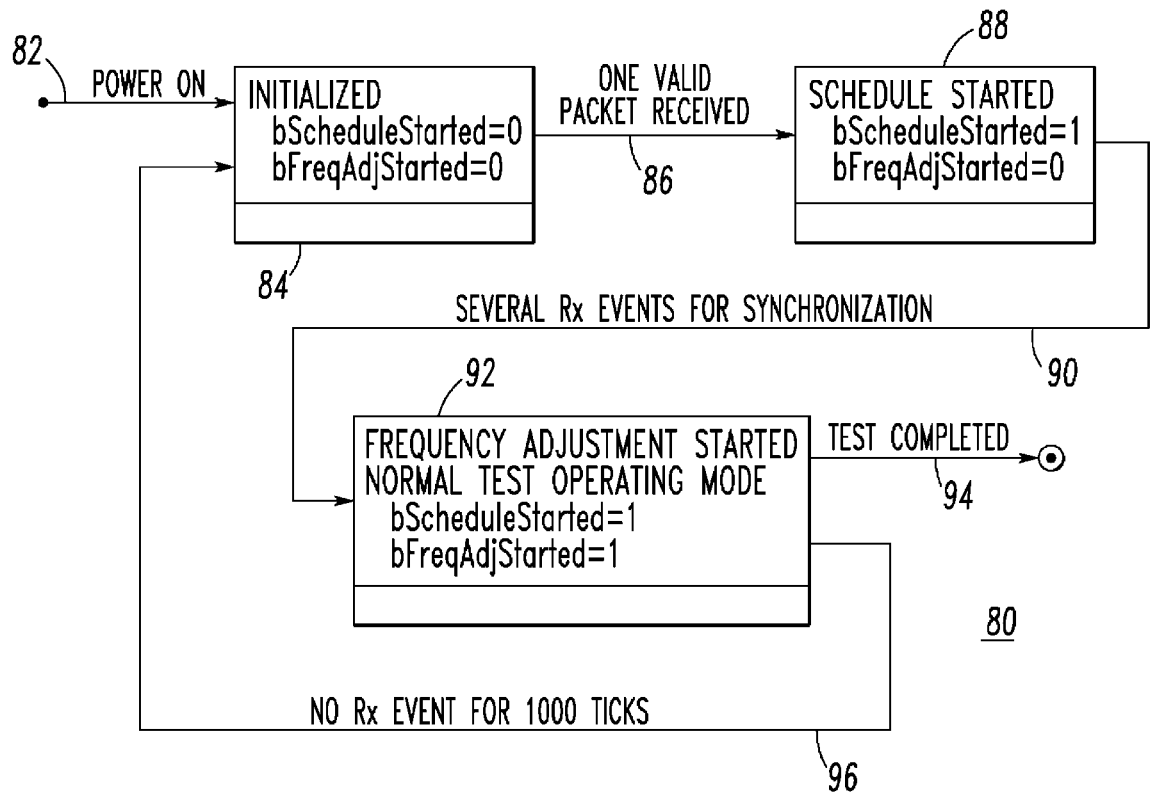
FIG. 6 is a state diagram of the initialization process for a non-master system node in accordance with an embodiment of the invention.

The mechanics of system control operate at two levels: (1) control of the overall execution of a test; and (2) control of actions during each tick. The state diagram 80 of FIG. 6 summarizes control of the overall test for nodes 10 other than the master node 8. Upon being turned on at 82, the typical system node 10 is initialized at 84 and then waits to receive a valid packet at 86. Each valid system packet includes the current schedule row and repetition, so that reception of any packet is sufficient for the system node 10 to synchronize with the schedule 24 at 88 and begin synchronizing its clock 48 (FIG. 2) at 92. When the node 10 is synchronized with the schedule 24 at 90, it begins receiving and transmitting packets according to that schedule 24. Finally, to avoid a startup-transient, several valid receive (Rx) packets are preferably received at 90 before frequency adjustment is started at 92. Here, "frequency adjustment" refers to automatic tuning of the compensation for any difference in the clock frequency between the master clock for the system (the clock 48 of the master node 8 (node #0)) and the local clock 48 of the non-master node 10.

The test is normally completed, at 94, after a predetermined number of iterations of the corresponding schedule 24. If, however, there was no receive event for a predetermined count of ticks (e.g., without limitation, 1000), at 96, then the initialization step 84 is repeated.

Figure 7:
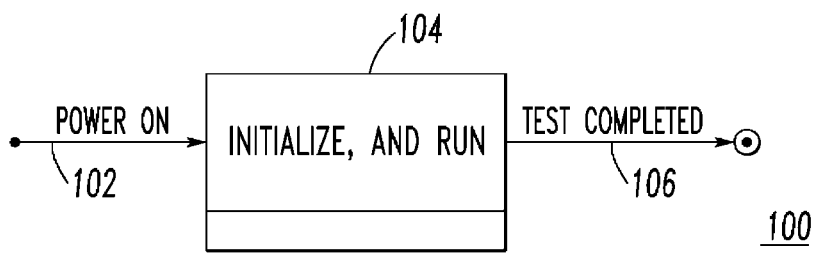
FIG. 7 is a state diagram of the initialization process for a master system node in accordance with an embodiment of the invention.

The state diagram 100 of FIG. 7 summarizes control of the overall test for the master node 8 (node #0; ID=0). The overall control of node #0 is particularly simple, because this node 8 simply starts executing the schedule 16 after it is powered up at 102 and is initialized at 104. The sequence of events for node #0 to execute a test is not influenced by any other node 10. The test completes at 106 after the predetermined number of iterations of the schedule 16. Here, there is no need for synchronization in the master node 8.

The overall control mechanisms of FIGS. 6 and 7 support the wireless nature of the system 2 through the fact that the simple control mechanism requires no control communication other than what is included in the test packets themselves. It does not matter in what order the nodes 8,10 are turned on since there are three states 84,88,92 (FIG. 6) in the overall control of the non-master nodes 10, and the system 2 automatically steps between these three states. There is no need for switches beyond the on/off switch 32 (FIG. 2) because there are no states to manually switch between. The state transitions of FIG. 6 are automatic, thereby permitting the system nodes 10 to synchronize and execute the test fully automatically. Because a system node 10 can synchronize using a packet received from any node 8,10, there is no dependence on receiving packets from any particular node, so that the test continues when any non-master node 10 is disabled, and only a small number of packets are required.

EXAMPLE 12

The system site survey is a sequence of ticks. Within each tick several things occur: (1) the corresponding schedule 16,24 is read and preparations are made to send or receive on the correct channel; (2) if the node 8,10 will transmit during the present tick, then it is set up as a transmitter, otherwise as a receiver; (3) any received packets are compared with the expected packet (as indicated by the corresponding schedule 16,24) and recorded if there is a match; (4) received packets that do not match the expected packet, but are of the correct length, are recorded for bit-error analysis; (5) received packets that are not the expected length are counted, for analysis of interference; (6) the synchronization algorithm 92 is run once per tick; and (7) the data recorded during the tick is logged to the data logger 44.

EXAMPLE 13

Figure 8:
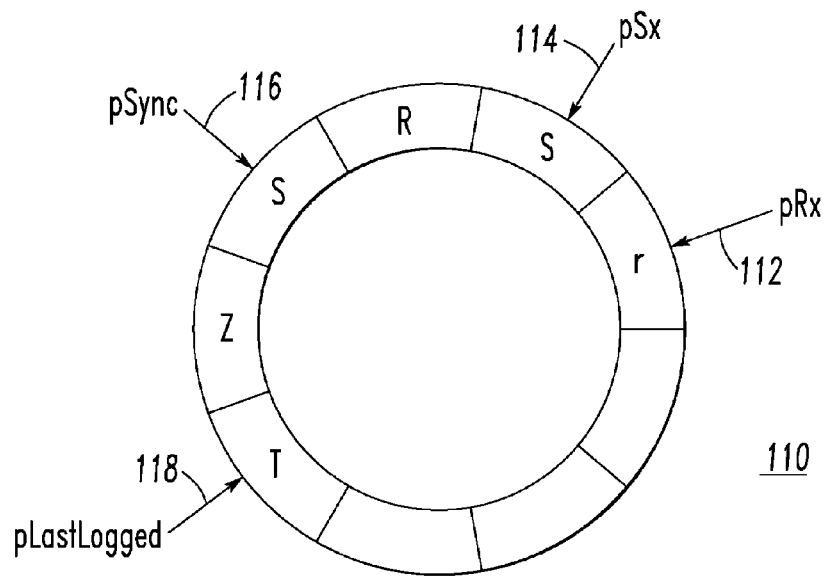
FIG. 8 is a block diagram of a ring buffer employed to control logging during a tick in accordance with an embodiment of the invention.

In order to de-couple the real-time actions of executing the ticks and transmitting or receiving packets from the asynchronous actions of running the synchronization algorithm 92 and logging the data, a ring buffer is preferably used. An example ring buffer 110 is shown in FIG. 8.

Four pointers to the elements of the ring buffer 110 provide tick execution control. The pointer pRx 112 points to the most recently written record. When a new packet is received, if it is to be recorded, the pRx pointer 112 is advanced clockwise (with respect to FIG. 8) to a new, empty record that is used to hold the data. The pointer pSx 114 points to the record holding the schedule and status data for the current tick. The synchronization algorithm 92 operates on the data of each tick. This is managed by the pointer pSync 116. Pointer pZx (not shown) points to a record used to count packets not matching the corresponding schedule 16,24. Data logging is managed by pointer pLastLogged 118. During operation, all of the pointers 112,114,116,118 advance clockwise (with respect to FIG. 8) around the ring. The letter designations shown in FIG. 8 mark each record according to its type. The following designations are used:

'S' a Setup record, which contains the schedule and status information for a tick. The schedule and status information in effect at each instant is in the record pointed to by pSx 114. Exactly one 'S' record is produced at the beginning of each tick. If a node transmits in the current tick, the 'S' label is converted to a 'T' label. If a node correctly receives during the current tick, the 'S' label is converted to a 's' label. Hence, FIG. 8 shows, for example, elements of at least 3 ticks. In general, the ring buffer 110 holds records produced during several ticks. Thus, the logging process can get several ticks behind before ring buffer protection begins to operate ('Z' and 'r' records are not produced).

'R' a received packet that is consistent with the record pointed to by pSx 114.

'r' a received packet that is the correct length, but otherwise is inconsistent with the record pointed to by pSx 114, or which has an invalid error detection code (e.g., without limitation, cyclic redundancy check as provided by the 802.15.4 standard and the radio hardware). These records are logged for post-processing to analyze bit errors.

's' when a valid 'R' packet is received, the record pointed to by pSx is relabeled as 's' (not shown). This shows that it is a setup record, but 's' records need not be logged.

'T' when a node transmits a packet, as determined by the corresponding schedule 16,24, the transmission is based on the schedule and status information in the 'S' record pointed to by pSx 114, which is re-labeled as 'T'.

'Z' received packets that do not match the expected length are counted in the data space provided by a 'Z' record. Pointer pZx (not shown in FIG. 8) points to the currently active 'Z' record.

All records are logged except for 's' records. The first character in each entry in the log file is the record letter designation.

The four pointers pRx 112, pSx 114, pSync 116, pLastLogged 118 control the execution during each tick and obey the relation: pLastLogged<pSync<pSx<=pRx.

When a new tick begins, a new record is allocated for the schedule and status information (pRx 112 is advanced). Then pSx 114 is set equal to pRx 112. The instant when pSx 114 points to the new record is the precise instant when the new tick begins. The synchronization algorithm 92 is executed once per tick. This is done asynchronously, and is activated by examining pSync 116 and pSx 114. After records have been passed by pSync 116, they can be logged. Records are freed and available for reuse when they are passed by pLastLogged 118. The number of records waiting to be logged, the number of free records available and other information about the state of the system 2 is obtained by examining the relative position of the pointers.

Pointer pZx (not shown) follows somewhat different rules. When a packet is received of incorrect length it is counted in a 'Z' record. If pZx points to a record, the packet is counted in that record. If not, a new 'Z' record is created (pRx 112 is advanced, the new record is initialized and pZx (not shown) is set to point to the new record). Pointer pZx obeys the relation: pLastLogged<pZx<=pRx.

EXAMPLE 14

Figure 9:
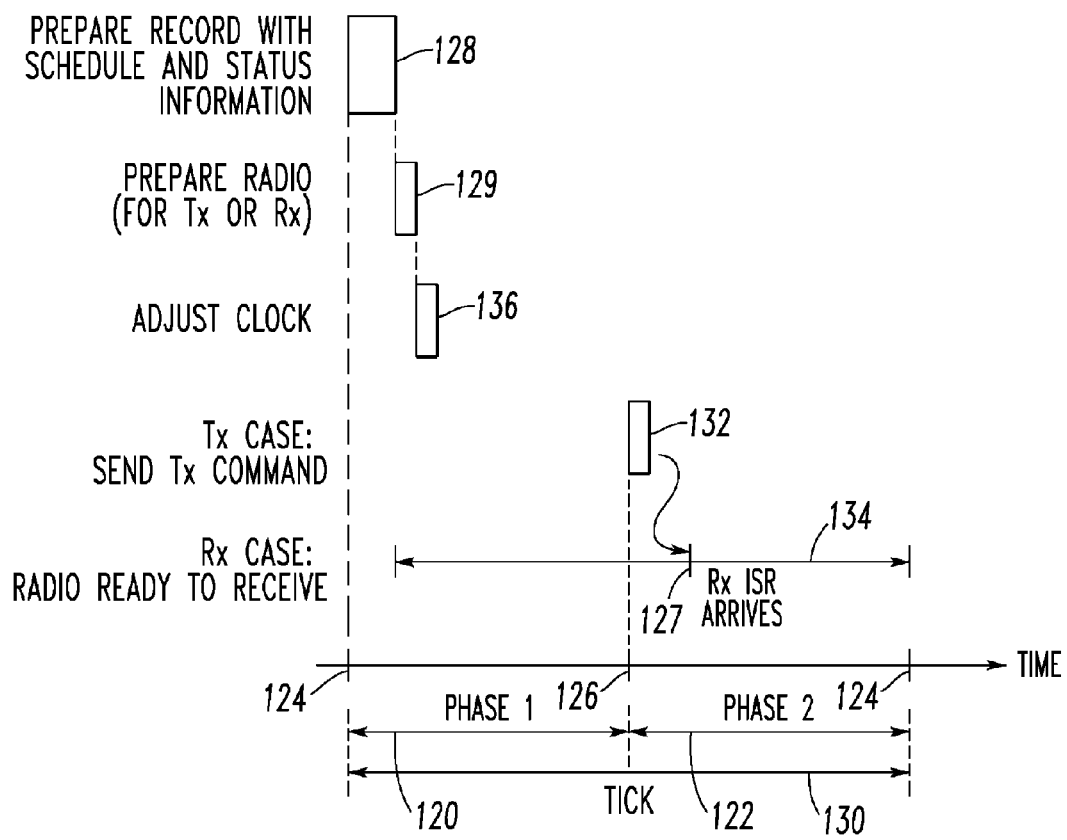
FIG. 9 is a timing diagram for the execution of a tick when system nodes are operational in accordance with an embodiment of the invention.

Each tick is executed in two phases, "Phase 1" (setup) 120 and "Phase 2" (transmit/receive) 122, as shown in FIG. 9. The actions of "Phase 1" 120 and of "Phase 2" 122 are driven by time-based interrupts 124 and 126, respectively. Processing a received packet is driven by an event-based interrupt 127. The execution of each phase 120,122 is activated by a timer-based interrupt. At the beginning of the first phase 120, the record in the ring buffer 110 (FIG. 8) is prepared with schedule and status information at 128 and the radio 38 (FIG. 2) is setup at 129 for the tick 130. At the beginning of the second phase 122, if the corresponding node 8,10 is selected to transmit, then the packet is transmitted at 132. The actions indicated in FIG. 9 occur inside interrupt service routines, and so their timing is well controlled. "Phase 1" 120 and "Phase 2" 122 are not precisely the same length, but rather are balanced to place the Rx interrupt service request 127 approximately in the middle of the interval 134 over-which the radio 38 (FIG. 2) is ready to receive. Tick execution control provides precise control of the system 2.

EXAMPLE 15

As to synchronization, in order to execute the schedules 16,24 in unison, the non-master system nodes 10 are accurately synchronized at 136, even though there is a low-cost clock 48 (FIG. 2) in each node 10. For a typical test, the system nodes 10 remain synchronized to within about a millisecond, even though a typical, low-cost crystal oscillator can gain or lose about a millisecond about every thirty seconds. An automatic adjustment learning mechanism is employed to automatically learn the adjustment required to compensate for the variability of the low-cost clock 48. This is the synchronization algorithm 92 (FIG. 6).

Continuing to refer to FIG. 9, when using the local clock 48 (FIG. 2), the time of arrival of a valid system packet at 127 is measured and is given the corresponding value utick. Based on the packet length, the radio processing time and the length of "Phase 1" 120, the ideal clock value for the arriving packet can be computed, giving uTickStar. The difference is given by: uTickTilde=uTick−uTickStar, where uTick is the count of crystal oscillator cycles from the beginning of "Phase 1" 120 to the time the Rx interrupt request arrives at 127. When the local clock 48 is ideally matched to the master clock (the clock 48 of node #0), uTickTilde is zero. Non-zero values of uTickTilde 131 cause the synchronization algorithm 92 of FIG. 10 to modify the stored values 133,135 for the adjustment of the local clock 48, and adjustment of the local clock period. The difference of the clock periods is learned, so that the local clock 48 can be continuously and automatically adjusted to agree with the master clock 48, even when a steady stream of received packets is not available.

EXAMPLE 16

Each node 8,10 has a "Sync Rank," which indicates the quality of its synchronization. The Sync Rank value serves to organize the nodes 8,10 into an acyclic directed graph (FIGS. 13A and 13B), which is essential for stable operation of the synchronization algorithm 92.

Synchronization co-operates with the schedule 24 to help provide the characteristics provided by or through the corresponding schedule 24. Additionally, the synchronization algorithm 92 helps provide a low cost system, by enabling the system 2 to operate with a relatively inaccurate local clock 48.

EXAMPLE 17

For initialization, the initialization mechanism of the system 2 has two elements: (1) the initialization files that give each system node 8,10 its unique identity, configuration and specify the corresponding schedule 16,24; and (2) the startup sequence that allows the system 2 to function automatically. The initialization files include: (1) NodeID.txt, which sets the local node's unique ID number; (2) Config.txt, which contains several configuration parameters; and (3) Schedule.txt, which contains the corresponding schedule 16,24.

The three states 84,88,92 of the startup sequence are described above in connection with FIG. 6. An additional aspect of the startup sequence is that in the "Initialized" state 84, the system node 10 is not synchronized with the schedule 24, and thus cannot tune directly to the channel on which the next system test packet will be broadcast. To achieve operation with very low packet success rate, the system nodes 10 reliably receive a first system test packet at 86 without prior designation of which node it will come from or which channel it will be on. That is to say that in the "Initialized" state 84, the system nodes 10 listen to each of the channels that are present in the schedule 24, and do so in a fashion that avoids systematically selecting an incorrect channel. For example, if the test schedule 24 involved channels #1 and #2 in the pattern: "1 2 1 2 1 2 . . . ," and the system test (node #0 and synchronized nodes 10) and an "Initialized" node had the system Test Channels: "1 2 1 2 1 2 . . . " and "Initialized" system node Channels: "2 1 2 1 2 1 . . . ," then the "Initialized" system node 10 might never receive a first packet.

To provide reliable synchronization without prior designation of the source node or channel, a system node 10 in the "Initialized" state 84 proceeds through the schedule 24 with a randomized interval for each row in the schedule 24 (e.g., the node proceeds linearly through the schedule 24 at a randomized rate). During each tick, the radio 38 (FIG. 2) is tuned to the channel corresponding to the selected row of the schedule 24.

The initialization mechanism 84 requires no external data, and thereby helps to provide a wireless system in which no wired or wireless network connection is required for a system node 10 to start the test, the system nodes 10 execute the test fully automatically, without external controlling signals, and the system nodes 10 reliably synchronize with the system test, even when the packet success rate is very low.

EXAMPLE 18

As for logging, the system 2 logs test data in a suitable removable digital media 34 (FIG. 2). The system 2 completely logs each transmitted packet, and each valid received packet, and, depending on available logging capacity, may log received packets which are not valid in all respects, but which match the packet length indicated by the corresponding system test schedule 16,24. This last group is logged so that packets received with an error can be analyzed to determine the exact bit errors.

An example of system logging is shown in FIG. 11. The example data 140 are logged in ASCII so that they are readable with a standard text editor (not shown). Alternatively, the data may be logged in binary, to conserve space in the removable digital media 34 (FIG. 2). In either case, the data are post-processed by a suitable computer (not shown).

When the system 2 is initialized, header information is logged reporting the Node ID, time and engineering information about the node. Column headings are printed in the log file for convenience, and then the data are logged. The example data 140 of FIG. 11 include 'S', 'T', 'r' and 'R' records. The record type 142, schedule repetition 144 and row 146 are recorded first. These are followed by the micro-tick (μT) 148 of the packet reception interrupt request, if the record is an 'R' or 'r', or the micro-tick on which the transmit command was sent, for a 'T' record. Next, comes status information in the column marked 'St' 150. These are binary flags that indicate whether the system control mechanisms were activated during the corresponding tick. The column marked 'BG' 152 shows the background receive signal strength indicator. The 'BG' column is followed by four columns indicating the configuration the node read from the schedule. 'Tx' 154, 'Ch' 156, 'Pw' 158 and 'Ln' 160 are the expected transmitting node ID, channel, power level and length. These are included to verify correct operation, and may be removed at a later time.

The bytes from 'Vr' 162 up to 'RS' 164 are the actual bytes sent or received over the air. In the case of an 'S' or 's' record, these are the bytes prepared, based on the Schedule Information, and are used when a packet is received to verify that it is a valid system packet. In the case of a 'T' record, these are the bytes transmitted, and in the case of an 'R' or 'r' record, these are the bytes received. Within the bytes transmitted, the fields are: (1) Table Version Number (Vr 162) (always 01); (2) Transmitting Node ID (ID 166); (3) Schedule Repetition (Srp 168) and Schedule Row (SRow 170) (two octets each); (4) 'SB' 172 the Sync Rank and Battery Monitor byte; (5) the 'Hearing History' (Hrng Hsty 174); and (6) Filler Bytes 176 (the number depends on the length of the packet). The two bytes following that are measurements of the receiver performance included in the IEEE 802.15.4 standard and made by the radio hardware; these are: (7) the Receive Signal Strength Indicator (RSSI) (RS 164); and (8) the Link Quality Indicator (LQI) (LQ 178). Finally, a check sum byte (CSum 180) is added, to assure that the data were correctly logged and read.

The logging method developed for the system 2 places heavy demands on the data logger 44 speed and capacity, but results in a very simple implementation. No data analysis is performed in the system node 8,10 (other than to identify valid system test packets). Complete local logging of the transmitted and received packets is an important aspect of the invention. Complete local logging supports a wireless system since the computation burden of analyzing the data in real time is not placed on the system node 8,10. This eliminates any complexity associated with selecting the method of data reduction from field operation of the system 2. Because a system node 8,10 has no logic to process received packets, other than marking valid received packets with an 'R', execution of the node logic has no dependency on the state of other nodes 8,10. There is, also, an absence of any need for a reliable way to communicate states between nodes 8,10. The data reduction is in the post-processing.

A particular advantage of the system 2 is that is not necessary to know what measurements are of interest in advance or even at the time of the first data analysis. Because all of the over-the-air behavior is logged, archived data are useful when new measurements become of interest. For example, the need to understand the correlation between channels might not be known at the time a test is conducted. However, with complete local logging, this characteristic could be analyzed at a later date from archived data. A system which only records packet success or failure does not provide sufficiently detailed archival data for in-depth analysis. A multi-dimensional data analysis is not possible without complete logging, since the processing would be too complex to do in real time. Also, measurement using complex schedules (such as two nodes transmitting at once), is impractical without complete logging and placing the complexity in the post-processing.

EXAMPLE 19

This example shows how schedules may have different lengths. For example, node #0 might have 64 entries and node #1 might have 128 entries. Then, node #1 will synchronize to node #0 by receiving, for example, several of the 64 test packets transmitted by node #0. While node #1 is listening for packets in the range 65 . . . 128, it will simply not recognize node #0 packets (node #0 entries 1 . . . 64 being repeated). Then, node #1 comes back to packets numbered 1 . . . 64, and refreshes its synchronization by receiving packets from node #0. Nodes #0 and #1 are in step because their schedule lengths have an integer ratio. This configuration permits, for example, node #1 to transmit on different channels during its entries 65 . . . 128.

The invention is disclosed in connection with the systems 2,50 (FIGS. 1 and 3) for assessment of wireless communication performance, although the invention is applicable to a wide range of wireless communication networks in which the various wireless nodes thereof have the need to be synchronized. One embodiment of the synchronization algorithm 92 (FIG. 6) is for communicating nodes having a relatively very low packet success rate. Although the systems 2,50 measure time in "ticks," the disclosed synchronization algorithm 92 can operate generally with clocks or timers measuring time and there is no requirement for "ticks".

In the example systems 2 (FIG. 1) and 50 (FIG. 3), time is divided into "ticks" of length $t_T$ (seconds). In basic operation, one wireless node, such as 8, transmits a packet during each tick. The packet may be received by all of the remaining nodes, such as 10. In order for the nodes 8,10 to transmit on the correct channel at the correct time, or to have their radio receivers tuned to the correct channel to receive the packet, the clock of each node needs to be synchronized to within at least $\pm t_T/2$ (seconds). The synchronization algorithm 92 employs the test packets themselves and does not rely on any "beacon" message or any other message or packet.

For example, a "count of ticks" may be given by CountOfficks=jScheduleRow+ (NScheduleRowsPerRepetition*jScheduleRepetition), wherein jScheduleRow is the schedule row number embedded in each packet (e.g., 201,203 of FIG. 13A), jScheduleRepetition is the schedule repetition number embedded in each packet, and NScheduleRowsPerRepetition is the number of schedule entries (before the schedule (e.g., 16,24 of FIG. 1) is repeated). For example, each node loads schedule information from its removable media. At each node, the value of NScheduleRowsPerRepetition is set by counting the number of schedule entries (rows in the schedule array) loaded from the removable media. Typically, the schedules of all nodes in a test will have the same number of rows (that is, typically, each node in a test will have the same value of NScheduleRowsPerRepitition).

The example embedded schedule row and schedule repetition numbers provide Schedule Synchronization Information as discussed herein. The foregoing or any other suitable "Schedule Synchronization Information" is sufficient information to determine the unique identity of the current tick, k, of Equation 2A, below. For example, suitable "Schedule Synchronization Information" can be embodied as an integer value for the current entry (row) of the schedule and current repetition of the schedule.

As employed herein, "Micro-Tick Synchronization Information" refers to the information needed to compute $\mu \tilde{t}(k)$ of Equation 1, below.

The system nodes, such 8,10,30,52, have, for example, a local crystal oscillator, such as the example hardware clock 48 of FIG. 2. Typical low-cost crystals have a part-to-part variability of approximately ±20 ppm and a temperature range variability of another ±20 ppm. Thus, one clock can gain or lose $t_T/2$ (seconds) with respect to another clock in $(1/2)*(1/2)*(1/40 \text{ [ppm]})=6,250$ Ticks (where the factor of 2× is because the two clocks of the transmitter and receiver might have opposite variations). If the system 2 is running, for example, at 50 ticks per second, then a tick has duration of 20 mS, and a clock offset of ±10 mS will cause system failure. Without synchronization, a clock difference of 10 mS could potentially build up in 125 seconds.

The synchronization algorithm 92 is responsive to disturbances. Disturbances take two forms: (1) errors in measurements, creating a disturbance within the synchronization algorithm 92; and (2) changes in the master clock rate. Timing measurements are made in the system nodes 8,10 from timer interrupt-based transmission of packets and from measuring the local time of the radio interrupt when the packet arrives. Measurement errors can be introduced by changes in the timing of either interrupt. As an example of a possible source of errors in measurements, there may be critical passages in asynchronous software which briefly disable interrupts. If the timer interrupt 126 (FIG. 9) for transmission arrives during one of these critical passages, then its service will be delayed.

The synchronization algorithm 92 incorporates a master clock. In one embodiment, the master clock is the clock of one of the communicating nodes (e.g., master node 8 of FIG. 1). Some systems of communicating nodes have a natural choice for the node with the master clock (e.g., the network coordinator of a ZigBee™ Alliance network). However, the only need is that at least one node receives Schedule Synchronization Information from the master clock.

In another embodiment, redundant master clocks are employed for reliability. One master clock provides the master Schedule Synchronization Information, with one or more other master clocks being on standby and ready to become active if the operating master clock fails.

EXAMPLE 20

As an example of changes in the master clock rate, a system node is located outdoors and is exposed to the sun on a late winter day. The node temperature might be warmer than ambient, and it might be suddenly shaded, or worse yet, overhanging snow might fall and suddenly cover the node. In either case, there is a rapid change of temperature. Considering the hardware clock 48 of FIG. 2 (e.g., without limitation, a Crystek Crystals model C15-SMD crystal at about 32,768 Hz, which has an example 20 ppm variation in clock rate with a change in temperature from 0° C. to 28° C.), such an event might produce a 20 ppm change in the node clock rate. If the node is a typical node, then its clock must re-adjust to the rate of the master node clock, and other nodes will be impacted by its clock transients. If the node is the master node 8, then the event rate for the entire experiment will change.

EXAMPLE 21

The synchronization algorithm 92 (FIG. 6) functions continuously to assure that there is never more than about $t_T/2$ (e.g., without limitation, about 1 mS) of difference between any two clocks in the system 2. For synchronization, the hardware clock 48 (FIG. 2) of the master node 8 (e.g., node #0) is the "master" clock. This local crystal oscillator clock of the system master node 8 is never adjusted. The local hardware clocks 48 of the other nodes 10 are synchronized with the master clock 48.

EXAMPLE 22

Four characteristics of the system 2 increase the challenge for synchronization: (1) the system 2 operates even if not all nodes 8,10 can receive packets from node #0; (2) the system 2 operates even if a node 8,10 receives packets only very occasionally; (3) feedback loops in the synchronization algorithm 92 must be avoided, to assure stability; and (4) the system 2 tolerates disturbances and maintains accurate synchronization.

EXAMPLE 23

Operation without assured communication to the master node 10 implies that non-master nodes 8 are able to synchronize to other non-master nodes 8. Operation, even if reception is intermittent, implies that the response to a packet must correspond to the recent history of receiving packets. Avoiding feedback loops means that the system 2 is self-organized into an acyclic (i.e., noncyclic) network.

The invention is described in association with a Kalman filter, although the invention is applicable to a wide range of suitable filters.

Figure 12:
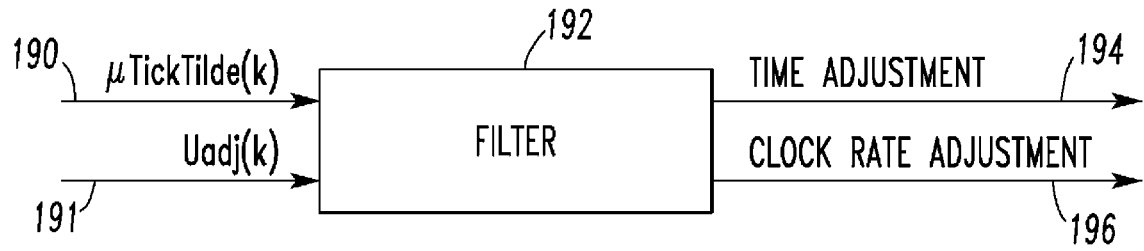
FIG. 12 is a block diagram of a synchronization algorithm as a filter in accordance with an embodiment of the invention.

FIG. 12 shows signal uTickTilde 190 (Equation 1) ($\mu \tilde{t}(k)$) is input by a filter 192 which produces estimates of both the time adjustment 194 and the clock rate adjustment 196 needed for the local clock (e.g., hardware clock 48 of FIG. 2 of the wireless node 10 of FIG. 1) to be synchronized with the master clock (e.g., hardware clock 48 of FIG. 2 of the wireless node 8 of FIG. 1).

EXAMPLE 24

A Kalman filter, which is one possible example of the filter 192, has the features of: (1) dynamically adjusting its gain according to the recent history of reception of Micro-Tick Synchronization Information; and (2) dynamically weighting arriving Micro-Tick Synchronization Information according to the Sync Rank (as will be discussed, below, in connection with FIG. 15) of the source node (e.g., low Sync Rank measurements get larger weights).

EXAMPLE 25

Time is measured in ticks and micro-ticks wherein:
T is a tick or, for example and without limitation, 25 mS for 40 Hz sampling; and μT is a micro-tick, or utick, which is one tick of a hardware clock (e.g., without limitation, $1/2^{15}$ seconds).

The time-base period is measured in micro-ticks per tick: $p_T$ (micro-ticks per tick) and the state of the local clock is represented by the difference between the master clock and the local clock. The time difference between the master clock and the local clock (i.e., the value of the local clock micro-tick at the instant when the master clock equals zero), measured in micro-ticks, is: $\Delta_{\mu T}=\mu_{T0}-\mu_{T1}$. The period difference between the master clock and local clock is: $\Delta_{PT}=\mu_{P0}-\mu_{P1}$. The state of the local clock is represented as its difference with the master clock, rather than the local time value and period. This way, the time value does not overflow. The master clock generates ticks by counting the hardware clock 48, so the master clock period must be an integer. For example, with a micro-tick rate of 32768 per second, $P_{T0}$=1024 gives the master clock a tick rate of 32 ticks per second.

The basic measurement of time of a measurable time quantity at a local node is the arrival time of a packet as shown in Equation 1:

$$\mu \tilde{T}(k)=\mu T^*(k)-\mu T(k) \quad \text{(Eq. 1)}$$

wherein:

μT(k) is the arrival time of a packet to the local node during tick k as measured by the local clock;

μT*(k) is the ideal arrival time of the packet to the local node during tick k, and μT*(k) is not constant because packets have various lengths; and μŤ(k) is the packet arrival-time difference, for tick k.

From Equation 1, μT*(k) must be known to determine μŤ(k), which is the input to the synchronization filter 192 of FIG. 12 (e.g., the synchronization algorithm 92 of FIG. 6). μT*(k) includes contributions from the ideal transmission time of the packet, which is based on the duration of the "Phase 1" 120 (FIG. 9), and a delay term comprising a constant contribution and a contribution per bit of packet length. That delay term accounts for all delays between the time of the Phase 2 interrupt 126 (FIG. 9) in the transmitting node and the time of the Rx interrupt 127 (FIG. 9) in the receiving node. For example, if the local clock is ahead of (e.g., faster than) the master clock, then μT(k) will be too large, and μŤ(k) will come out to be negative.

EXAMPLE 26

FIG. 12 shows the basic operation of the synchronization algorithm 92 (FIG. 6), where μŤ(k) 190, the packet arrival-time difference, for tick k, drives the filter 192 to estimate the time (clock) adjustment 194 and the clock rate (frequency offset) adjustment 196. The filter 192 may be, for example, a model-based clock adjustment estimator in which the outputs of the estimator are the time (clock) adjustment 194, ΔμT(k), and the clock rate adjustment 196, ΔpT(k).

In general, the term "frequency" refers to the frequency of the hardware clock 48 (e.g., the crystal oscillator frequency), and the term "period" refers to the period of a tick 130. Considering units, the period is expressed in micro-ticks per tick, the standard frequency is expressed in crystal oscillator cycles per second, and one micro-tick is one crystal oscillator cycle. Hence, the conversion is [micro-ticks/tick]=[cycles/second]×[seconds/tick]. Thus, the relationship between "period" and "frequency" is not the usual reciprocal relationship because they are really "crystal frequency" (or clock frequency) and "tick period" (or the period of a tick 130). Therefore, after the duration of a tick 130 is fixed by the hardware clock 48 of the master node (e.g., node 8), then "micro-ticks per tick" is given by the clock frequency value times the value of seconds per tick.

The signal Uadj(k) 191 is also an input to the Kalman filter 192. The importance of considering Uadj(k) 191 as an input to the estimator depends on whether the general notion of estimating the ΔμT(k) value 133 and the μp(k) value 135 is considered (FIG. 10), or whether the specific realization of the Kalman filter 192 (FIG. 12), which employs $U_{adj}(k)$ (see Equations 2A and 26, and UInput of Equation 32), is considered.

EXAMPLE 27

The filter 192 is preferably a Kalman filter, which is an adaptive, low-pass, infinite impulse response digital filter, with cutoff frequency depending on the ratio between process and measurement noise, as well as an estimate covariance S. The Kalman filter is expressed in the time domain instead of the frequency domain.

Although a Kalman filter is disclosed, any suitable filter type may be employed.

EXAMPLE 28

The system model for the Kalman filter is provided from Equations 2-5:

$$X(k+1) = AX(k) + BU_{adj}(k) + Gv(k) \quad \text{(Eq. 2A)}$$

$$\mu \tilde{T}(k) = CX(k) + w(k) \quad \text{(Eq. 2B)}$$

wherein:

$$A = \begin{bmatrix} 1 & 1 \\ 0 & 1 \end{bmatrix} \quad \text{(Eq. 3A)}$$

$$B = \begin{bmatrix} 1 \\ 0 \end{bmatrix} \quad \text{(Eq. 3B)}$$

$$C = [1 \ 0] \quad \text{(Eq. 3C)}$$

$$G = \begin{bmatrix} 1 & 0 \\ 0 & 1 \end{bmatrix} \quad \text{(Eq. 3D)}$$

X(k) is a general representation, at tick k, of one of: (i) X*(k), the ideal state of the Kalman filter output, (ii) XBAR(k), the state of the Kalman filter output following the process update, and (iii) XHAT(k), the state of the Kalman filter output following the measurement update;

X(k+1) is the same as X(k), except at tick k+1;

$U_{adj}(k)$ is adjustment to the local clock (e.g., lengthening or shortening of a tick);

w(k) is a sample of the measurement noise process; and v(k) is a sample of process noise in order that noise in the phase and frequency of the local clock can be represented:

$$v(k) = \begin{bmatrix} v_1(k) \\ v_2(k) \end{bmatrix} \quad \text{(Eq. 4)}$$

For the Kalman filter to be optimal, v(k) and w(k) should be white, uncorrelated Gaussian-distributed noise processes with covariance matrices:

$$E\{v^T v\}=V \in R^{2\times 2} \quad \text{(Eq. 5A)}$$

$$E\{w^T w\}=W \in R^{1\times 1} \quad \text{(Eq. 5B)}$$

wherein:

V is the covariance matrix of process noise;

W is the covariance matrix of measurement noise; and

R indicates that matrix values are real, with the superscript indicating the size of the corresponding matrix.

The Kalman filter is recognized as an effective, sub-optimal filter in practical situations where the noise processes may not meet the ideal mathematical conditions. For the systems 2,50, as in many practical cases, V and W many not be known from analysis, but rather the elements of these matrices are adjusted to tune the Kalman filter. This is described, for example, in connection with Equations 37-39, below.

Starting with Equations 2-5, above, the conventional Kalman filter is expressed in Equations 6-12, below. The Kalman filter is a two stage process (process and measurement). Equation 6 shows the process update. SBAR(k+1) (Equation 7) is the covariance matrix after the process update, while SHAT (k) (Equation 12) is the covariance matrix after the measurement update. XBAR(k) and XHAT(k) are likewise the states following the process update and the measurement update, respectively. Both XBAR(k+1) (Equation 6) and XHAT(k) (Equation 10) are 2-vectors including two elements: Delta_T (which corresponds to the time (clock) adjustment 194, $\Delta\mu T$ (k), of FIG. 12) and Delta_P (which corresponds to the clock rate (period offset) adjustment 196, $\Delta pT(k)$). The input uTickTilde 190 is closely related to Delta_T, but they are not exactly the same thing, since uTickTilde is a measurement (with measurement noise) and Delta_T is an estimate (usually with less noise; also always available as a signal, not just on ticks with measurements).

XBAR(k+1) and SBAR(k+1) are projections of the Kalman filter state and covariance, respectively, one sample into the future. For example, for k=3, from Equation 6, XBAR(4)= A(XHAT(3))+BU$_{adj}$(3), and from Equation 7, SBAR(4)=A (SHAT(3))A$^T$+GVG$^T$. The choice to increment k in the middle of the synchronization algorithm 92 is made because the process updates can be made before the next measurement sample comes in.

$$XBAR(k+1)=A(XHAT(k))+BU_{adj}(k) \quad \text{(Eq. 6)}$$

wherein:

XBAR(k+1) is the Kalman filter state following the process update for tick k+1 ("XBAR" is pronounced "X BAR"); and XHAT(k) is the Kalman filter state following the measurement update for tick k and is an estimator for $\mu\ddot{t}$ at sample (tick) k ("XHAT" is pronounced "X HAT").

Equation 7 computes the impact on the covariance matrix of updating the process.

$$SBAR(k+1)=A(SHAT(k))A^T+GVG^T \quad \text{(Eq. 7)}$$

wherein:

SBAR(k+1) is the Kalman filter covariance matrix after the process update for tick k+1 ("SBAR" is pronounced "S BAR"); and SHAT(k) is the Kalman filter covariance matrix after the measurement update for tick k (see, also, Equation 37) ("SHAT" is pronounced "S HAT").

After a new measurement has arrived, k is incremented. Equations 6 and 7, above, are implemented as predictions of the state and Kalman filter covariance matrix at the next time step. Next, Equation 8 computes the Kalman Gain, L(k).

$$L(k)=SBAR(k)C^T(C(SBAR(k))C^T+W(k))^{-1} \quad \text{(Eq. 8)}$$

wherein:

W(k) is measurement noise of sample k;

T indicates the matrix transpose operation; and

SBAR(k) is the Kalman filter covariance matrix.

Equations 9 and 10 compute the state estimate after the measurement.

$$\epsilon(k)=\mu\tilde{T}(k)-C(XBAR(k)) \quad \text{(Eq. 9)}$$

$$XHAT(k)=XBAR(k)+L(k)\epsilon(k) \quad \text{(Eq. 10)}$$

wherein:

$\epsilon(k)$ is output error of the estimator at sample (tick) k; and

XHAT is an estimator for $\mu\ddot{t}$ at sample k.

From a filter point of view, if $\epsilon(k)$=0, then the filter states need no adjustment.

Finally, Equations 11 and 12 compute the impact on the covariance matrix of incorporating the measurement information. W(k) will depend on the Sync Rank of the sample.

$$P=I-L(k)C \quad \text{(Eq. 11)}$$

$$SHAT(k)=P(SBAR(k))P^T+L(k)W(k)L(k)^T \quad \text{(Eq. 12)}$$

wherein:

P is a matrix given by Equation 11; and

I is the identity matrix.

Equations 6-12, above, provide one example implementation for synchronizing the system nodes 10.

EXAMPLE 29

To implement the Kalman filter in, for example, C-language and with fixed point calculations, three additional actions are needed. First, the calculations are represented in 32-bit fixed point (rather than floating point). For example, 12.20 fixed point is employed with 20 bits to the right of the decimal point. Second, the elements of SHAT (and SBAR) exist on quite different scales. These two S matrices are suitably scaled to properly operate with the fixed-point arithmetic. Third, the matrix-vector calculations of Equations 6-12 are unwound to give algebraic equations for C-language. The S, V and W matrices scale, and so could be adapted to any suitable choice of fixed-point representation.

Multiplication and division involve right and left shifts, respectively, such that x'=$\alpha_{FP}$x, y'=$\alpha_{FP}$y, and z'=$\alpha_{FP}$z, where x, y, and z are floating point numbers, and x', y' and z' are their respective fixed-point representations, and $\alpha_{FP}$ is the fixed-point scale factor. After defining n$_{FP}$ as being the number of bits each value is shifted, $\alpha_{FP}$=2 is raised to the n$_{FP}$ power. For the example 12.20 representation, n$_{FP}$=20 and $\alpha_{FP}$=2$^{20}$. Then, when z=xy, Equation 13 holds:

$$z'=\alpha_{FP}xy=\alpha_{FP}(x'/\alpha_{FP})(y'/\alpha_{FP})=x'y'/\alpha_{FP} \quad \text{(Eq. 13)}$$

Hence, a product must be scaled by 1/$\alpha_{FP}$, or be shifted to the right by n$_{FP}$ bits. Likewise, when z=x/y, Equation 14 holds:

$$z'=\alpha_{FP}\alpha_{FP}x/\alpha_{FP}y=\alpha_{FP}(x'/y') \quad \text{(Eq. 14)}$$

Here, a quotient must be scaled by $\alpha_{FP}$, or be shifted to the left by n$_{FP}$ bits.

Routines for multiplication and division are employed which measure the number of non-zero bits in each operand, and dynamically determine the bit shifts to produce Equations 13 and 14 and maintain precision. Dynamic determination of the shifts is employed to avoid underflow and overflow during the calculation of Equations 6-12. Additionally, a division routine may introduce rounding (rather than truncation intrinsic in C-language operations). With positive-valued divisions, truncation may introduce a significant downward bias in the computed values. For example, in division operations, rounding is achieved by adding one half of the denominator to the numerator before the division is performed.

The $\Delta_{\mu T}$ values 194 as output from FIG. 12 are large relative to the output $\Delta_{pT}$ values 196 since the clock period is better known, and likewise the SHAT(1,1) value turns out to be much larger than the SHAT(2,2) value. For this reason, it is useful to scale the S matrix. This scaling could also be important for floating point calculation, if the dimension of the matrix inversion in Equation 8 were greater than 1.

Equation 15 defines the invertible scaling matrix.

$$\Lambda = \begin{bmatrix} 1 & 0 \\ 0 & \alpha \end{bmatrix} \quad \text{(Eq. 15)}$$

wherein:
$\alpha$ is 128 in this example.

From the definitions of Equations 16A-16D, Equation 17 then results.

$$SHAT_p = \Lambda(SHAT)\Lambda^T \quad \text{(Eq. 16A)}$$

$$SHAT = \Lambda^{-1}(SHAT_p)\Lambda^{-T} \quad \text{(Eq. 16B)}$$

$$SBAR_p = \Lambda(SBAR)\Lambda^T \quad \text{(Eq. 16C)}$$

$$SBAR = \Lambda^{-1}(SBAR_p)\Lambda^{-T} \quad \text{(Eq. 16D)}$$

$$SBAR_p(k+1) = A_p(SHAT_p(k))A_p^T + G_p V G_p^T \quad \text{(Eq. 17)}$$

wherein:
Equations 16A-16D, above, are not similarity transforms (e.g., eigenvalues are not preserved); and
Equations 18A-18C, below, are similarity transforms.

$$A_p = \Lambda(A)\Lambda^{-1} \quad \text{(Eq. 18A)}$$

$$C_p = C\Lambda^{-1} \quad \text{(Eq. 18B)}$$

$$G_p = \Lambda G \quad \text{(Eq. 18C)}$$

Plugging the expressions of Equations 16A-16D in as needed, the calculation of the measurement update is then given by Equation 19.

$$L_p(k) = SBAR_p(k)C_p^T(C_p(SBAR_p)C_p^T + W(k))^{-1} \quad \text{(Eq. 19)}$$

wherein:
$L_p(k) = \Lambda L(k)$.

Equation 20 computes the measurement update using $L_p(k)$ $$XHAT(k) = XBAR(k) + \Lambda^{-1} L_p(k)\epsilon(k) \quad \text{(Eq. 20)}$$

wherein:
XBAR(k) and XHAT(k) are unchanged.

The impact on the covariance matrix of incorporating the measurement information is determined from Equations 21 and 22:

$$P_p = I - L_p(k)C_p \quad \text{(Eq. 21)}$$

$$SHAT_p(k) = P_p(SBAR_p(k))P_p^T + L_p(k)W(k)L_p(k)^T \quad \text{(Eq. 22)}$$

wherein:
W(k) is measurement noise of sample k.

Heuristically, if there have been no measurement updates for several ticks, then the Kalman filter will over-compensate the period estimate, $\Delta_{pT}$, 196. For example, if the example Kalman filter 192 starts perfectly tuned, and a disturbance arrives which modifies the clock period of the master clock by $\Delta_{pT}^o$, then the local node does not receive a packet for $N_{mu}$ samples. In this case, the output error of the Kalman filter 192 when the first measurement update occurs, $\epsilon(k)$, will be $N_{mu}\Delta_{pT}^o$. The adjustment of the local clock period is given as $L_2\epsilon(k)$, or $L_2 N_{mu}\Delta_{pT}^o$, which shows that the effective gain increases as $N_{mu}$ increases. Also, observed overshoot of xhat2 (Equation 32) motivates a method to lower the effective gain for xhat2.

Thus, introducing $N_{mu}$ in Equation 20, for each tick, $N_{mu}$ is incremented and a gain term is introduced as shown in Equation 23.

$$XHAT(k) = XBAR(k) + \Lambda^{-1} \begin{bmatrix} 1 & 0 \\ 0 & 1/N_{mu} \end{bmatrix} L_p(k)\epsilon(k) \quad \text{(Eq. 23)}$$

Combining Equations 3, 15 and 17-22 with Equation 6 gives the complete calculation in matrix-vector form as shown in Equations 24-30.

$$A = \begin{bmatrix} 1 & 1 \\ 0 & 1 \end{bmatrix} \quad \text{(Eq. 24A)}$$

$$B = \begin{bmatrix} 1 \\ 0 \end{bmatrix} \quad \text{(Eq. 24B)}$$

$$C = [1 \; 0] \quad \text{(Eq. 24C)}$$

$$G = \begin{bmatrix} 1 & 0 \\ 0 & 1 \end{bmatrix} \quad \text{(Eq. 24D)}$$

$$\Lambda^{-1} = \begin{bmatrix} 1 & 0 \\ 0 & \alpha^{-1} \end{bmatrix} \quad \text{(Eq. 24E)}$$

$$A_p = \Lambda(A)\Lambda^{-1} \begin{bmatrix} 1 & \alpha^{-1} \\ 0 & 1 \end{bmatrix} \quad \text{(Eq. 25A)}$$

$$C_p = C\Lambda^{-1} = [1 \; 0] \quad \text{(Eq. 25B)}$$

$$G_p = \Lambda G = \begin{bmatrix} 1 & 0 \\ 0 & \alpha \end{bmatrix} \quad \text{(Eq. 25C)}$$

wherein:
$A_p$, $C_p$ and $G_p$ have particularly simple forms.

The complete calculation is given in matrix-vector form by Equations 26-30.

$$XBAR(k+1) = A(XHAT(k)) + BU_{adj}(k) \quad \text{(Eq. 26)}$$

$$SBAR_p(k+1) = A_p(SHAT_p(k))A_p^T + G_p V G_p^T \quad \text{(Eq. 27)}$$

$$L_p(k) = SBAR_p(k)C_p^T(C_p(SBAR_p)C_p^T + W(k))^{-1} \quad \text{(Eq. 28)}$$

$$XHAT(k) = XBAR(k) + \Lambda^{-1} \begin{bmatrix} 1 & 0 \\ 0 & 1/N_{mu} \end{bmatrix} L_p(k)\epsilon(k) \quad \text{(Eq. 29)}$$

$$SHAT_p(k) = P_p(SBAR_p(k))P_p^T + L_p(k)W(k)L_p(k)^T \quad \text{(Eq. 30)}$$

Defining $V_p = G_p V G_p^T$ gives (Eq. 31)

$$V_p = \begin{bmatrix} vp11 & vp12 \\ vp12 & vp22 \end{bmatrix} = \begin{bmatrix} v11 & \alpha v12 \\ \alpha v12 & \alpha^2 v22 \end{bmatrix}$$

wherein:
V in Equation 5 is $$V = \begin{bmatrix} v11 & v12 \\ v12 & v22 \end{bmatrix}$$

Here, vp values are used by the C-language, since v22 would be less than 1, even in 12.20 notation.

Equations 26-30 are, thus restated as respective Equations 32-36, wherein Equation 32 is unaffected by scaling, Equations 33 and 34 employ scaled values, Equation 35 is corrected for scaling (i.e., un-scaled) and Equation 36 provided the scaled values.

xbar1=xhat1+xhat2−F2INT32*UInput xbar2=xhat2  (Eq. 32)

sbar11=shat11+2shat12/alpha+shat22/alpha$^2$+vp11
sbar12=shat12+shat22/alpha+vp12
sbar22=shat22+vp22  (Eq. 33)

L1=sbar11/(sbar11+W)

L2=sbar12/(sbar11+W)  (Eq. 34)

xhat1=xbar1+L1*(uTickTilde−xbar1)

xhat2=xbar2+L2*((uTickTilde−xbar1)/TicksSince-
LastFreqAdjust)/alpha  (Eq. 35)

t1=(1−L1)

shat11=t1$^2$*sbar11+L1$^2$*W shat12=−t1*L2*sbar11+t1*sbar12+L1*L2*W shat22=L2$^2$*sbar11−2*L2*sbar12+sbar22+L2$^2$*W  (Eq. 36)

wherein:
xbar1 and xbar2 are the elements of XBAR;
xhat1 and xhat2 are the elements of XHAT;
F2INT32 is a suitable constant (e.g., 2$^{20}$) for converting floating point values to 32-bit fixed point values;
UInput is the same as U$_{adj}$(k), which is the adjustment to the local clock (lengthening or shortening of a tick) made in tick k;
sbar11, sbar12 and sbar 22 are the elements of SBAR;
shat11, shat12 and shat 22 are the elements of SHAT;
alpha is the same as α, which is a suitable scaling factor (e.g., 128);
vp11, vp12 and vp22 are elements of the process noise (drift in the clock period), Vp;
L1 and L2 are elements of Lp(k), which is a 2-vector; and
TicksSinceLastFreqAdjust is the count of ticks since the last frequency adjustment.

There are three noise contributions as shown by Equations 37-39.
Equation 37 shows the initialization of the covariance matrix, SHAT:

$$SHAT = \begin{bmatrix} 4{,}611{,}686 & 0 \\ 0 & 0 \end{bmatrix}$$  (Eq. 37)

Equation 38 shows the process noise (drift in the clock period), vp:

vp11=3,022 vp12=0 vp22=1,000  (Eq. 38)

Equation 39 shows the vector of Wp values where the index is the Sync Rank value:

W$_s$=[1,152,922 4,611,686 10,376,294 18,446,744]  (Eq. 39)

Figure 16:
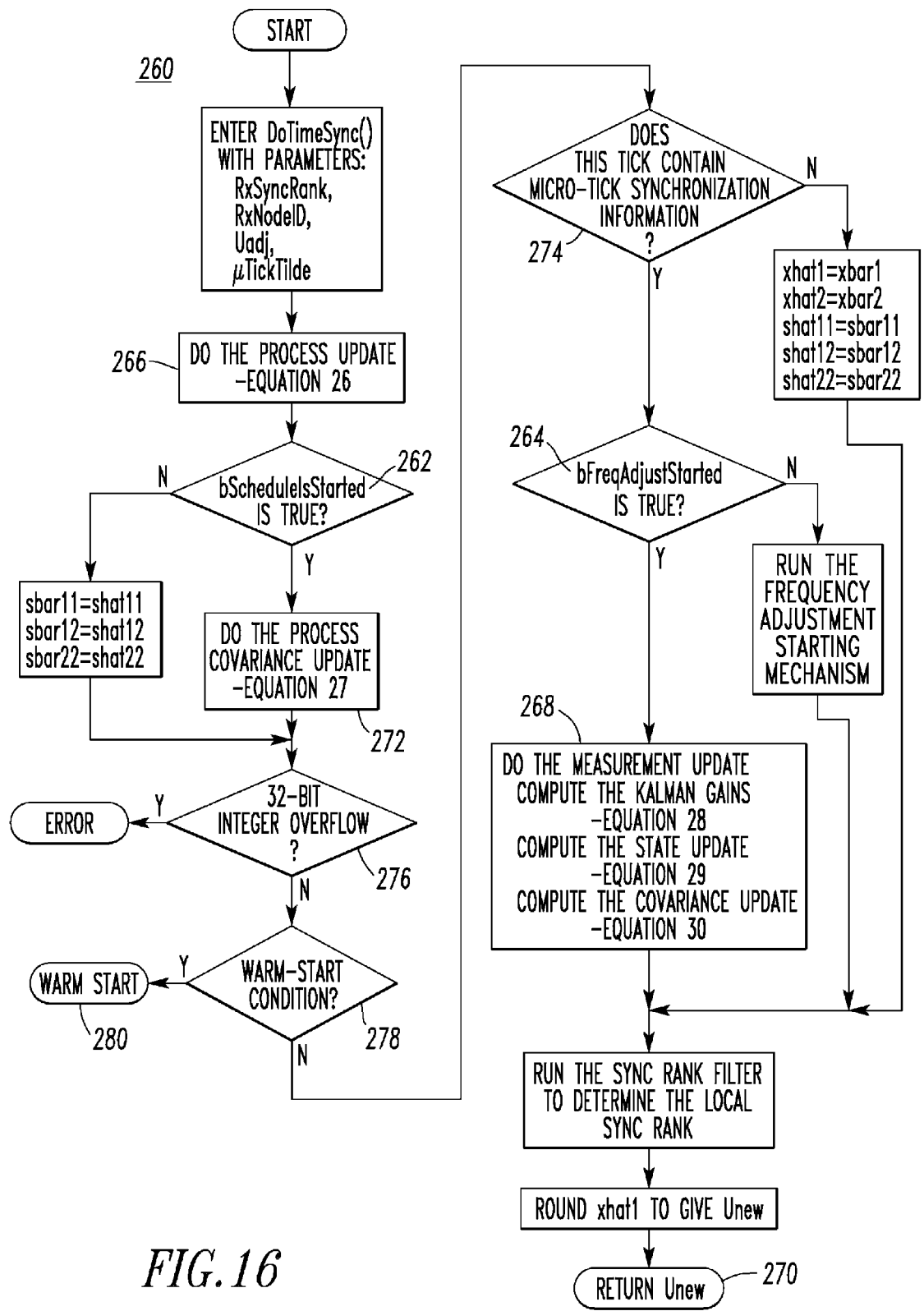
FIG. 16 is a flowchart of a DoTimeSynch( ) routine in accordance with an embodiment of the invention.

The noise contributions function by ratio, so all values can be scaled up or down and (neglecting the limits of integer arithmetic), the example Kalman filter 192 will run without change. These values are scaled so that V$_p$ is not too small (e.g., in order to limit round off error) and SBAR and SHAT will not overflow (e.g., to provide suitable head room). Increasing SBAR over a threshold causes a warm restart 280 (FIG. 16). With the values above and running at 16 ticks per second, a warm restart occurs in 4.5 minutes (=260 seconds=4160 ticks). If this is too long, then it could be reduced by scaling up all values of SHAT, V$_p$ and W$_s$.

EXAMPLE 30

Figure 13A:
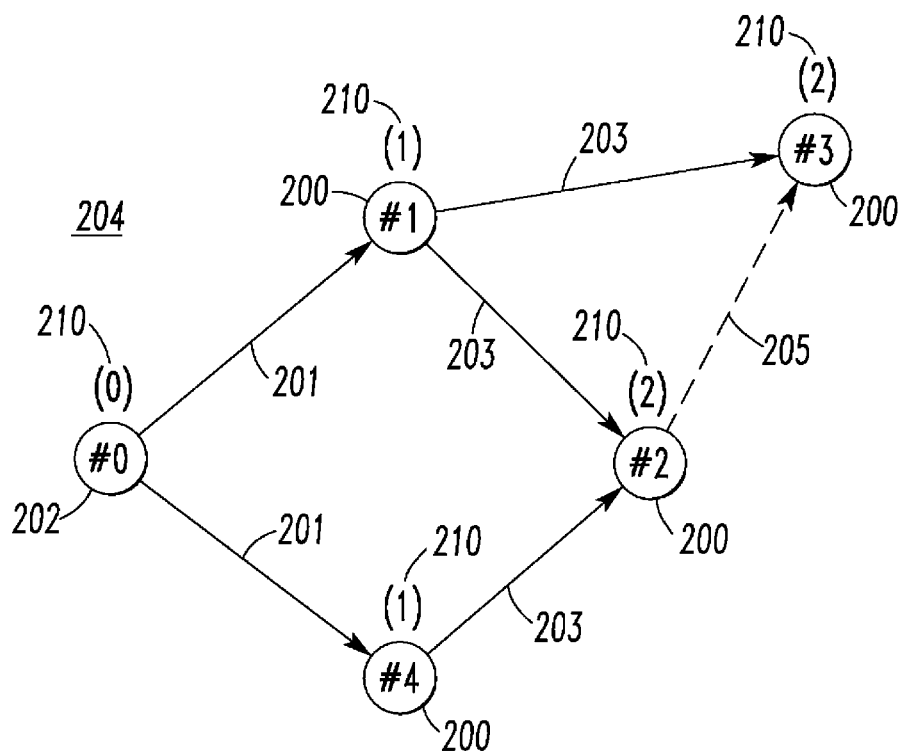
FIG. 13A is an acyclic directed graph with five nodes.

The synchronization algorithm 92 (FIG. 6) is preferably designed to avoid loops in the communication of Micro-Tick Synchronization Information. Referring to FIG. 13A, because not all nodes 200 may be able to receive packets 201 from the master node 202, it must be possible for a node to synchronize its local clock based on measurement updates arriving with packets 203 from a node other than the master node 202. This creates the possibility of a closed path in the propagation of Micro-Tick Synchronization Information (e.g., a node #2 will adjust its clock to match the time of node #5 (not shown), while node #5 is adjusting its clock to match the time of node #2). Since a measurement update to the Kalman filter state can occur only when a packet arrives, the adjustments to nodes #2 and #5 in this example will generally not be simultaneous, and a closed feedback loop with delay is created. In the presence of a closed feedback loop with delay, the ordinary performance and stability analysis for the Kalman filter 192 is not applicable, and unexpected behavior is possible.

While it is possible to design synchronization mechanisms that tolerate closed feedback loops, Kalman filtering, larger gains and more rapid synchronization convergence are possible if closed feedback loops are excluded.

To ensure that there are no closed loops in the transmission of Micro-Tick Synchronization Information, the ensemble of the system test nodes 200,202 self-organizes into an acyclic directed graph 204. The edges of the graph 204 are shown at 201 and 203. Micro-Tick Synchronization Information is passed along edges 201 and 203 in the direction shown, such as from node #0 to node #4 (shown at 201), or from node #1 to node #2 (shown at 203). The five example nodes 200,202 are shown within circles and are numbered #0 through #4, and represent the system nodes. Node #0 is the master node 202. For example, node #2 is synchronized from nodes #1 and #4. The edges have a direction (as shown), since the node #2 clock is adjusted to match the time given by the clocks of nodes #1 and #4, but neither node #1 nor node #4 will adjust its clock according to a packet (not shown) received from node #2. Here, a Sync Rank mechanism blocks the opposite path, as will be explained. The dashed line 205 in FIG. 13A shows the additional propagation of Micro-Tick Synchronization Information in an optional configuration, which is also described below.

An acyclic graph is one with no cycles, or closed loops. Neglecting direction, the graph 204 of FIG. 13A is not acyclic. For example, when direction is neglected, there is a loop formed by the edges running from node #0 to node #1 to node #2 to node #4 and back to node #0. The directed graph 204, however, is acyclic. Such a loop (not shown) would run counter the direction of the edges from nodes #0 to #4 to #2. A larger example of an acyclic directed graph 208 formed by the system nodes 200,202 is shown in FIG. 13B.

Figure 13B:
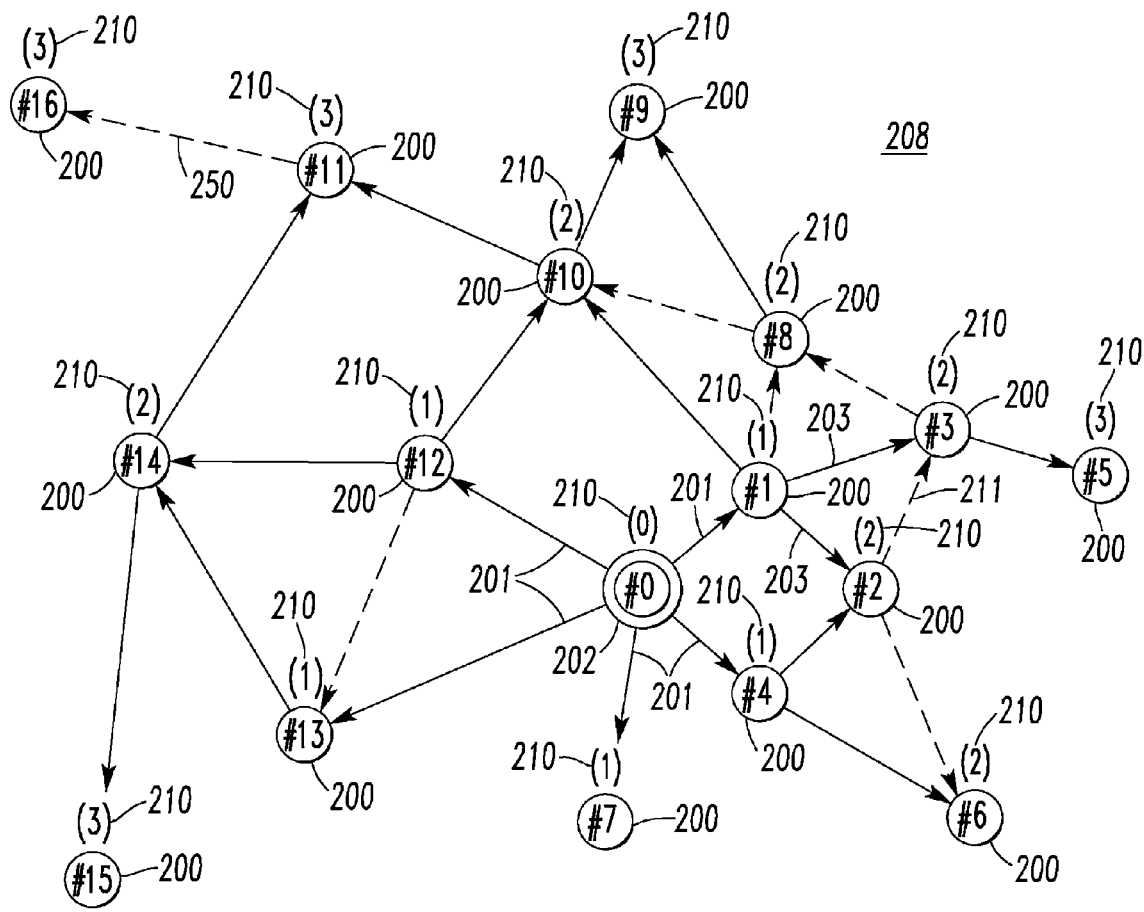
FIG. 13B is a relatively larger acyclic directed graph realized by a Sync Rank algorithm in accordance with an embodiment of the invention.
Figure 14:
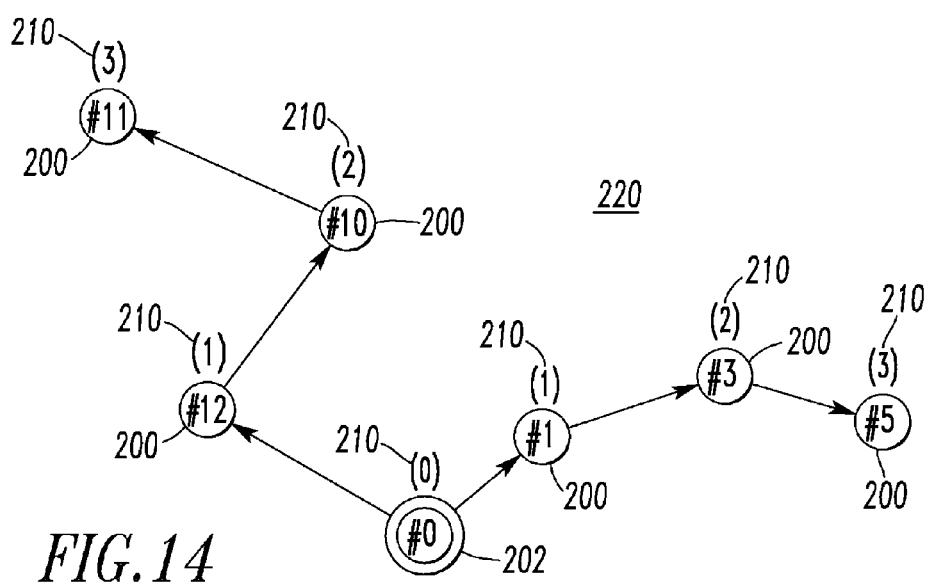
FIG. 14 is a graph showing that the greatest span of a wireless communication network is six hops in accordance with an embodiment of the invention.

Above each of the nodes 200,202 in FIGS. 13A and 13B, a value called Sync Rank 210 is shown in parentheses. This value is equal to the smallest number of hops that Micro-Tick Synchronization Information must travel to arrive from node #0. For example, Micro-Tick Synchronization Information can travel by more than one path to arrive at node #2, but no path requires less than two hops, and so the Sync Rank 210 of node #2 is 2. Each node maintains an internal variable MySyncRank, which is updated each time the synchronization algorithm 92 (FIG. 6) is executed (once per tick), and which holds the value of the node's Sync Rank 210. For example, if node #3 receives packets 203 and 211 from both node #1 and node #2, then the value of node #3 will be MySyncRank=2, because Sync Rank value of 1 packets arrive from node #1. With four Sync Rank levels, the greatest span of the system network 220 is six hops, as shown in FIG. 14, with Sync Rank 210 in parenthesis.

The method of computing MySyncRank is explained in connection with the algorithm 230 of FIG. 15. A bank of (N_SYNC_RANKS−2) filters (numbered from 1 to N_SYN-C_RANK_FILTERS 232), maintains information about the time since the most recent packet at a given Sync Rank has arrived. Here, N_SYNC_RANK_FILTERS=N_SYNC_RANKS−1.

If a packet 201,203 (FIGS. 13A, 13B) arrives with Sync Rank RxSyncRank, then filters corresponding to greater Sync Rank values are charged to an upper value. For example, with N_SYNC_RANKS=4 (e.g., for Sync Rank values of 0, 1, 2 and 3), then N_SYNC_RANK_FILTERS=3, corresponding to filters with jRank 234=0, 1 and 2. Here, there is no need to run a filter for Sync Rank value of 3 since the Sync Rank 210 value is never greater than 3. There is likewise no need to run a filter for Sync Rank value of 0, since only the master node 202 can have Sync Rank value of 0, and this node always has Sync Rank value of 0.

The logic of algorithm 230 determines if the corresponding node is Sync Rank value of 1, and then holds up the Sync Rank value of 2 filter, in order that the node 200 goes through a Sync Rank value of 2 stage upon leaving Sync Rank value of 1. Or, if this is a valid receive (RxSyncRank≧0), and if the Sync Rank value of the corresponding node is less than or equal to the corresponding Sync Rank filter, then the algorithm 230 charges that Sync Rank filter to an upper value at 238.

At 236, if (MySyncRank<jRank) OR ((RxSyncRank is valid) AND (RxSyncRank<jRank)), then at 238 since a packet is received at this Sync Rank re-charge the filter, otherwise, since no packet was received at this Sync Rank, discharge the filter at 240. MySyncRank is the index if the first filter with a value is above a threshold.

The Sync Rank filters decay with a predetermined time constant (e.g., without limitation, about 720 ticks, with the values given). If no packet at a given level is received in this time, then the node 200 moves to the next higher Sync Rank value at 242 or 244. A node which is no longer receiving any packets will eventually take Sync Rank value of 3 at 246. There is a separate mechanism (FIG. 6) for detecting a complete loss of synchronization and re-initializing the node.

When a packet 201,203 arrives in tick k, a value of $\mu \hat{\tau}(k)$ is computed. However, that value is only used as a measurement update in the synchronization Kalman filter 192 (FIG. 12) if the Sync Rank of the packet is lower than the Sync Rank of the current node 200 (RxSyncRank<MySyncRank), thus enforcing an acyclic directed graph 204,208 like that shown in FIGS. 13A and 13B. In this non-limiting example, TWO_15 is 32,768, TWO_14 is 16,384, and TWO_10 is 1024 in FIG. 15.

EXAMPLE 31

In an optional configuration, some additional values of $\mu \hat{\tau}(k)$ are used for measurement update of the Kalman filter 192. In this configuration, if a packet 201,203 arrives in tick k with (RxSyncRank=MySyncRank) and (TxNodeID<MyNodeID), then a measurement update is done. This rule increases the average number of measurement updates in the system, thereby shortening the time constant for the system to respond to a disturbance. This rule also increases the quality of synchronization of nodes 200 at the edge of the network, where Sync Rank value of 3 nodes 200 may be able to receive packets 250 (FIG. 13B) only from Sync Rank value of 3 nodes. Examples of the extra connections in this configuration are seen as dashed lines in FIGS. 13A and 13B.

Execution of a routine DoTimeSync( ) 260 of FIG. 16 is made asynchronous to reduce the time during which interrupts are masked (which would give Rx_ISR 127 (FIG. 9) jitter). Correct asynchronous execution is managed with the pSync pointer 116 to the ring buffer 110 (FIG. 8). A routine RecordRingManager::RunTimeSync( ) (not shown) tests to see whether records corresponding to a completed packet 201,203 are available on the ring. These records are then processed. Routine DoTimeSync( ) 260 is called once per tick, but after the tick has been completed.

In the routine DoTimeSync( ) 260, if boolean variables bScheduleIsStarted 262 and bFreqAdjustStarted 264 are both true, then the routine 260 runs sequentially through Equations 26 to 30 at 266, 272 and 268 to execute the synchronization estimator. The signal bScheduleIsStarted 262 controls execution of the covariance update (Equation 27) at 272, and the signal bFreqAdjustStarted 264 controls execution of the measurement update (Equations 28-30) at 268. The output of the DoTimeSync( ) routine 260 is Unew 270, which is the new adjustment value passed ultimately to a ClockAdjustment( ) routine, which is discussed below. If the schedule 16,24 (FIG. 1) is not started, then this indicates that the node 10,200 has been turned on, but has not started receiving packets 201,203 carrying Micro-Tick Synchronization Information. In this case, there is no process update and Equation 27 is bypassed at 272. In general, if bScheduleIsStarted 262 is false, then the test for "Does this tick contain Micro-Tick Synchronization Information" at 274 will also be false, and the measurement update calculation at 268 will also be bypassed. The overflow 276 and warm-start 278 tests are based on the values of the SBAR matrix (e.g., sbar11; sbar12; sbar22) (Equation 33) growing too large. The warm-start test 278 is a part of normal operation and determines that the node 10,200 has not received a packet 201,203 with Micro-Tick Synchronization Information for a sufficient interval that synchronization may be lost. The warm-start procedure 280 resets a number of variables and causes the node 10,200 to re-enter the synchronization algorithm 92.

A challenge is that two asynchronous processes must work with the adjustment of the clock, Timesync( ) and ClockAdjustment( ). Adjustments go through three stages: (1) requested (based on a measurement update, DoTimeSync( ) 260 has returned a non-zero value for $U_{ts}$=Unew 270); (2) executed (the requested adjustment) (ClockAdjustment( ) has added or subtracted micro ticks to the duration of the Phase 1 timer); and (3) recognized (the executed adjustment) (during a process update, DoTimeSync( ) 260 has recognized that the adjustment was made, which shows up as input $U_{adj}$ to the Kalman filter 192).

Going from the executed stage (ClockAdjustment( ) is the producer) to the recognized stage (DoTimeSync( ) 260 is the consumer) is straightforward since adjustments are recorded in the "S" records on the ring 110, and are recognized by DoTimeSync( ) 260 as it processes those records.

Going from the requested stage to the executed stage is more challenging, since one has to assure that a requested adjustment is only executed once. As an added challenge, when there is a clock rate difference, the requested adjustments will accumulate indefinitely and simple counters will overflow.

EXAMPLE 32

With reference to FIG. 12 and Equations 9, 10 and 35, the input $\mu\tilde{t}(k)$ (uTickTilde) 190 (the difference between the time when a packet should have ideally arrived ($\mu T^*(k)$) at tick k versus the time when the packet actually arrived ($\mu T(k)$) at tick k) of the Kalman filter 192 produces estimates (XHAT) of both the time adjustment 194 (xhat2=$\Delta_{pT}$ (micro-ticks per tick) of Equation 35 is the period difference between the master clock (e.g., clock 48 of master node 8) and the local clock 48, and the clock rate adjustment 196 (xhat1=$\Delta_{\mu T}$ (micro-ticks) of Equation 35 is the time difference between the master clock and the local clock 48) needed for the local clock 48.

If the local clock 48 is ahead of the master clock, then the apparent time of the arrival of a packet will be too late (e.g., a train appears to arrive late when timed against a fast clock). Thus, the locally measured value of $\mu T(k)$ (Equation 1) will be too big. From Equation 1, if the measured time of arrival of a packet from a synchronized source is late (i.e., the local clock 48 is ahead), then $\mu\tilde{t}$ (Equation 1) is negative, and xhat1 likewise takes a negative value. As a result, if the local clock 48 is ahead, then the duration of Phase 1 is increased, thereby adding a number of extra micro-ticks to the current tick. A positive value of xhat1 indicates that the local clock 48 is behind and, thus, xhat1 ticks are added to the local clock 48 to get to the proper master clock value. A positive value of xhat2 indicates that the local clock 48 is slow, and negative values indicate that the local clock 48 is fast.

For example, xhat2 gives the adjustment in micro-ticks per tick required to match the local clock 48 to the master clock. If, for example, xhat2=+0.005 and $p_{TO}$=2048, then the relative rate of the local clock 48 is slow by: +0.005 (micro-ticks per tick)×1,000,000/2048 (micro-ticks per tick)=2.44 ppm (parts per million). Thus, the local clock 48 must be adjusted forward by +0.005 micro-ticks per tick to keep up with the master clock. A negative value of $U_{ts}(k)$=Unew 270, which is the signal returned by the routine DoTimeSync( ) 260, causes the local clock 48 to be set back. Conversely, a positive value of $U_{ts}(k)$=Unew 270 causes a forward adjustment of the local clock 48.

Of the following three example mechanisms, none is generally required.

EXAMPLE 33

The transmit timing during a tick cycle is precisely controlled. When the receiving node 10,200 receives a packet 201,203, an interrupt is generated by the hardware. The local clock time of the interrupt indicates the offset between the local clock and the clock of the transmitting radio. This is the basic measurement upon which synchronization is based. In one embodiment, precise control of transmit timing is not required. For the synchronization algorithm 92, packets 201, 203 carrying Micro-Tick Synchronization Information can be transmitted at any suitable time. The receiving node 10,200 needs to determine the ideal time for packet reception if the local and master clocks are well synchronized. That is the term $\mu T^*(k)$ in Equation 1. Term $\mu T^*(k)$ could be determined, for example, by transmitting each test packet at a well known time within the corresponding tick, and locally computing $\mu T^*(k)$ based on the locally known transmission time and observed length of the packet. Alternatively, $\mu T^*(k)$ could be determined by embedding into the packet 201,203 the transmitter clock value at the time of transmission.

EXAMPLE 34

The quality of the clock synchronization of the transmitting node is indicated by its "Synchronization Rank" (Sync Rank), which, for example, is a value of #0, #1, #2 or #3. Only the master node 8,202 has Sync Rank value of 0. Nodes 10,200 that reliably receive Sync Rank value of 0 packets have a Sync Rank value of 1. Nodes 10,200 that reliably receive Sync Rank value of 1 packets have a Sync Rank value of 2, and nodes 10,200 that reliably receive Sync Rank value of 2 packets have a Sync Rank value of 3.

The general need is for a mechanism to organize the communicating nodes into an acyclic directed graph (ADG).

While the Sync Rank algorithm 230 (FIG. 15) is one mechanism for organizing the nodes into an ADG, it is not the only one. For example, selection based on Device ID number can be used (e.g., only use the Micro-Tick Synchronization Information if RxIDNumber<MyIDNumber, where RxID-Number is the Device ID number from a received packet, it is the ID of the transmitter, while MyIDNumber is the Device ID number of the local node).

Another method to organize the nodes 8,10,200,202 into an ADG is for a network engineer to do it (e.g., by examining the nodes and their connections and organizing them into an ADG). This organization (e.g., a table listing each node along with other nodes from which it will receive Micro-Tick Synchronization Information) could be provided to the ensemble of nodes as initialization data.

EXAMPLE 35

For Kalman filtering, a Kalman filter 192 (FIG. 12) processes the measurement of clock difference made each time a packet 201,203 is received, and adjusts the local clock. By carrying forward information about the quality of the current clock difference estimate (in the SHAT matrix), the Kalman filter 192 calibrates its response to each packet according to the rate and Sync Rank of arriving packets.

Dynamic gain adjustment is very important for handling the variable rate at which Micro-Tick Synchronization Information arrives. Suitable dynamic filters operate under conditions in which a fixed-gain filter will fail. The basic operation of dynamic filter gain adjustment is that the filter gains go down during periods when relatively many (e.g., relative to the time interval for loss of synchronization; without limitation, more than 20 packets during a 125 second interval) packets arrive carrying Micro-Tick Synchronization Information. In a related manner, the gains go up during periods when relatively few (e.g., relative to the time interval for loss of synchronization; without limitation, less than 3 packets during a 125 second interval) packets arrive carrying Micro-Tick Synchronization Information.

EXAMPLE 36

An example circuit structured to provide dynamic adjustment of filter gains is implemented as follows. The circuit low-pass filters the timing-data arrival rate and uses the resultant value for a table lookup of pre-stored information:

$$\text{TimingDataArrivalRate}(k)=(1-c1)*\text{TimingDataArrivalRate}(k-1)+c1*b\text{TimingArrived}(k) \quad \text{(Eq. 40)}$$

$$k1(k)=\text{LookTable\_}k1(\text{TimingDataArrivalRate}(k)) \quad \text{(Eq. 41)}$$

$$k2(k)=\text{LookTable\_}k2(\text{TimingDataArrivalRate}(k)) \quad \text{(Eq. 42)}$$

If there is new timing data, then compute Equations 43 and 44.

$$\text{Delta\_P\_Estimate}(k)=(1-k1(k))*\text{Delta\_P\_Estimate}(k-1)+\mu T(k)/\text{PeriodSinceLastTimingUpdate}(k) \quad \text{(Eq. 43)}$$

$$\text{Delta\_T\_Estimate}(k)=(1-k2(k))*\text{Delta\_T\_Estimate}(k-1)+\mu T(k) \quad \text{(Eq. 44)}$$

wherein:
c1 is a filter gain constant (e.g., without limitation, 0.99);
bTimingArrived(k) is {0, 1} (i.e., one if timing data arrived on sample k, else zero);
TimingDataArrivalRate is in the range of [0 . . . 1] (i.e., relatively higher if the arrival rate is relatively higher; zero if the arrival rate is zero);
LookTable_k1TimingDataArrivalRate(k)) is a lookup table for the Delta_P filter, and TimingDataArrivalRate(k) is converted to an index for that table;
LookTable_k2(TimingDataArrivalRate(k)) is a lookup table for the Delta_T filter, and TimingDataArrivalRate(k) is converted to an index for that table; and
Delta_P_Estimate(k) is an output of the filter;
Delta_T_Estimate(k) is an output of the filter;
PeriodSinceLastTimingUpdate(k) is the time period since the last timing update.

EXAMPLE 37

Figure 17:
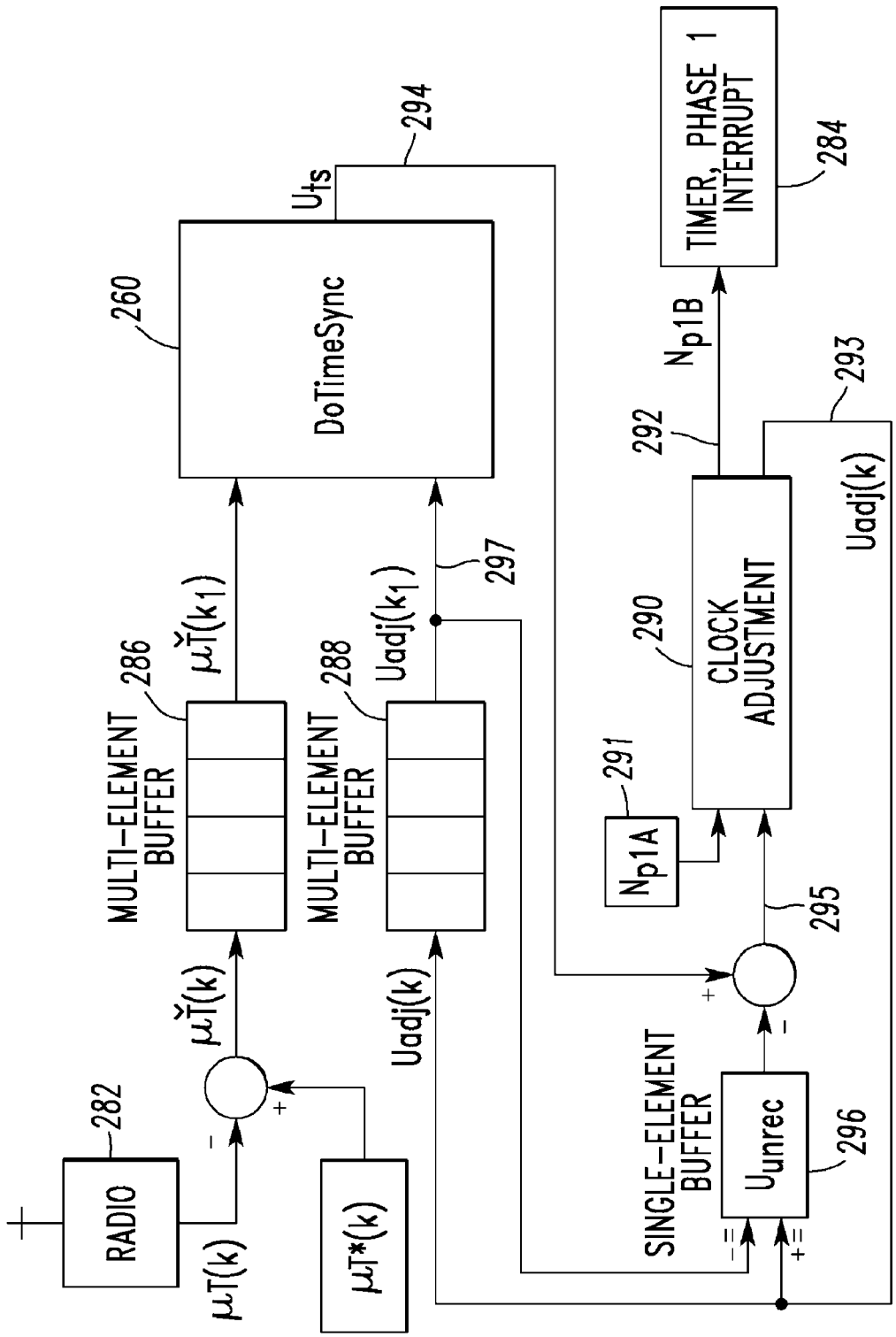
FIG. 17 is a block diagram of the timer adjustment mechanism in accordance with an embodiment of the invention.

Referring to FIG. 17, a node radio 282, the corresponding routine DoTimeSync( ) 260 (FIG. 16) and a corresponding local node timer 284 are shown. When a test packet arrives at the radio 282 in tick k, the local-clock time of the Rx interrupt is μT(k). Using Equation 1, μ(k) is computed and stored in a multi-element buffer 286, which can store several consecutive values, whereas a single-element buffer, such as 296, is one with a single value. The two multi-element buffers 286, 288 each have an element for every value of k. The elements are organized in a ring buffer, in order that storage space can be reused after the contents are utilized. Additional data including the Sync Rank (not shown) and NodeID (not shown) of the transmitting node are also recorded when there is a packet reception by the radio 282.

Since a test packet is not received in each tick k, some elements of the buffer 286 are empty. Ordinarily, two valid test packets cannot be received in a single tick. However, if that should happen, then both μṪ(k) values would be recorded in the buffer 286, and the data of both would be dropped.

Also, in each tick k, during the processing of the Phase 1 interrupt, the mechanism ClockAdjustment( ) 290 is activated and an adjusted timer value is computed. Value $N_{p1A}$ 291 is the default Phase 1 timer value (StandardPhase1uTicks). Value $N_{p1B}$ 292 is the adjusted timer value that is loaded into the timer 284 to set the duration of the kth Phase 1 (Phase1AdjustedLength). Uadj(k) 293 is the value of the adjustment applied on tick k and is shown in Equation 45.

$$Uadj(k)=N_{p1A}-N_{p1B}(k) \quad \text{(Eq. 45)}$$

wherein:
$N_{p1A}$ is a constant; and
$N_{p1B}(k)$ is the value for the Phase 1 timer computed on tick k.

Routine DoTimeSync( ) 260 operates asynchronously from the ticks. At some time, routine DoTimeSync( ) 260 processes tick k1, where k1 is a past tick index. Typically, routine DoTimeSync( ) 260 operates within one or a few ticks of the time at which the data μṪ(k) and Uadj(k) 293 are recorded by the respective buffers 286,288. That is, typically, 1≦(k−k1)≦5. For every tick, there is a valid Uadj(k) 293 and routine DoTimeSync( ) 260 is called once for every tick, whether or not there is a valid packet reception or a valid μṪ(k) value. In this way, all Uadj values are processed (in the process update of the Kalman filter 192 (FIG. 12). The measurement update (which incorporates μṪ(k)) is conditionally processed, including only processing when there is a valid measurement of μṪ(k).

Routine DoTimeSync( ) 260 produces value Uts 294. The value (Uts−Uunrec) 295 is an input to routine ClockAdjustment( ) 290 that indicates the desirable number of ticks of adjustment. Routine ClockAdjustment( ) 290 determines the actual adjustment to make from the set of possible adjustments, and produces two outputs: $N_{p1B}$ 292 and Uadj(k) 293, as described above. The value Uunrec 296 reflects adjustments, which have been previously made, but have not yet been reconciled by DoTimeSync( ) 260. When an adjustment of Uadj(k) 293 is made, its value is added to Uunrec 296. When a value of Uadj(k1) 297 is processed by DoTime Sync( ) 260, its value is subtracted from Uunrec 296. The notation "−=" and "+=" indicates the respective subtraction of and addition of these values to the current value within the single-element Uunrec buffer 296.

Figure 10:
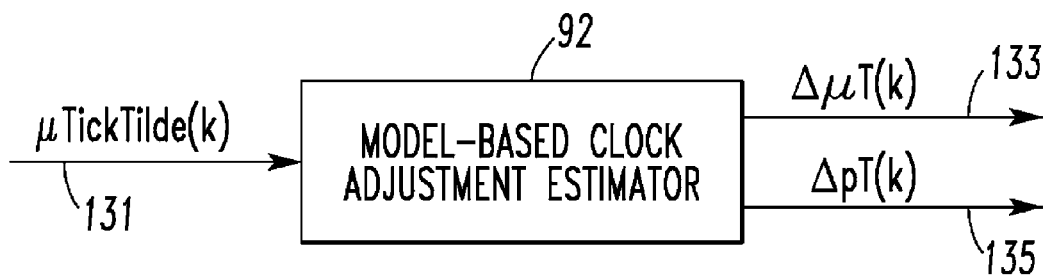
FIG. 10 is a block diagram of a filter that processes uTickTilde signals to produce an estimate of clock offset and needed adjustment of clock period in accordance with an embodiment of the invention.

FIG. 12 shows the Uadj(k) 191 input, while FIG. 10 does not. In one case, the second input to the Kalman filter 192 is not needed. This occurs when the execution of DoTime Sync( ) 260 is synchronized (for example, DoTimeSync( ) executes during Phase 2, after the end of the receiver interrupt service routine processing), and there is no problem with selecting a Uts 294 value, which is too large (no external ClockAdjustment 290 routine is incorporated). Then, Uadj(k) 293 is Uts(k−1) and the information Uadj(k) 191 is already available in DoTimeSync( ) 260. In this case, the inputs and outputs of DoTimeSync( ) 260 are shown in FIG. 10.

Otherwise, Uadj(k) 191 may be something other than Uts (k−1), and, hence, it is an input to the Kalman filter 192 of FIG. 12.

EXAMPLE 38

The value of uTicksPerTick (e.g., without limitation, 2048) is loaded into each node with initialization data, and is normally the same in each node. The values of StandardPhase1uTicks and StandardPhase2uTicks are given according to Equations 46 and 47:

$$\text{StandardPhase1}u\text{Ticks}=\text{floor}((u\text{TicksPerTick}-16)/2) \quad \text{(Eq. 46)}$$

$$\text{StandardPhase2}u\text{Ticks}=u\text{TicksPerTick}-\text{StandardPhase1}u\text{Ticks} \quad \text{(Eq. 47)}$$

wherein:
StandardPhase1uTicks is the unadjusted duration from 124 to 126 in FIG. 9;
StandardPhase2uTicks is the duration from 126 to 124 in FIG. 9; and
floor( ) is a function that returns the next lower integer. This is to handle the case that uTicksPerTick is an odd number.

The factor of 16 is subtracted so that StandardPhase1uTicks is somewhat shorter then StandardPhase2uTicks. This is because it is desirable that µT(k) (which occurs at 127 of FIG. 9) is in the center of the tick, and µT(k) is somewhat after the phase 2 interrupt (shown at 126 of FIG. 9).

In FIG. 17, StandardPhase1uTicks is shown as $N_{p1A}$ 291. The ClockAdjustment 290 determines the StandardPhase1uTicks, which is shown as $N_{p1B}$ 292.

Additionally, two more parameters are loaded with the initialization data. RxIntDelayOffset (e.g., without limitation, 5; any suitable value) is a constant part of the delay between the transmission signal and the Packet-Received interrupt 127, measured in micro-ticks. This parameter is suitably empirically tuned. RxIntBitsPeruTick (e.g., without limitation, 8; any suitable value) is a part of the delay between the transmission signal 132 and the Packet-Received interrupt 127, which varies in correspondence to the length of the packet. To work well with integer arithmetic, this is expressed as bits (transmitted) per micro-tick. This parameter is based on the bit rate of the corresponding wireless technology.

Equation 48 shows the calculation of µT*(k).

$$\mu T*(k) = StandardPhase1uTicks + RxIntDelayOffset + \quad \text{(Eq. 48)}$$
$$(PacketLengthInBits)/RxIntBitsPeruTick$$

wherein:
PacketLengthInBits is the packet length expressed in bits. For example, if the packet length is 20 bytes, then PacketLengthInBits=8*20 bits.

EXAMPLE 39

As one non-limiting example, if RxIntDelayOffset=5, RxIntBitsPeruTick=8, uTicksPerTick=2048, StandardPhase1uTicks=1016, StandardPhase2uTicks=1032, and uTick of Transmission=1016, then µT*(k)=1016+5+(20*8)/8=1041 (for a 20 byte packet), µT*(k)=1016+5+(30*8)/8=1051 (for a 30 byte packet), and µT*(k)=1016+5+(128*8)/8=1149 (for a 128 byte packet).

While factors or improvement of, for example, 100 or 1000 times, in the accuracy of clock crystals is readily available, but at increased cost, the disclosed synchronization algorithm 92 provides a cost reduction.

Furthermore, precise synchronization will be required by the future SP100.11 standard for wireless nodes for automation. Precisely (e.g., without limitation, +/−0.5 mS) synchronized wireless nodes for automation could provide another application for the synchronization algorithm 92.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system employing a plurality of packets, said system comprising:
   a first wireless node comprising:
      a first clock including a plurality of first times,
      a first wireless transceiver, and
      a first processor cooperating with said first wireless transceiver to transmit and receive a first set of said packets, said first processor being structured to transmit ones of said first set of said packets at corresponding ones of the first times of said first clock; and
   a plurality of second wireless nodes, each of said second wireless nodes comprising:
      a second clock including a plurality of second times,
      a second wireless transceiver structured to wirelessly communicate with the first wireless transceiver of said first wireless node or with another one of said second wireless nodes,
      a second processor cooperating with said second wireless transceiver to transmit and receive a second set of said packets, said second processor being structured to transmit ones of said second set of said packets at corresponding ones of the second times of said second clock, and
      a filter comprising:
         a plurality of filter gains,
         an input representing a difference between a third time and a fourth time, said third time being when a received one of the second set of said packets should have ideally been received by said second wireless transceiver, said third time being about one of the second times of said second clock, said fourth time being when said received one of the second set of said packets was actually received by said second wireless transceiver as measured by said second clock,
         a circuit structured to provide dynamic adjustment of said filter gains, said dynamic adjustment providing a relatively smaller filter gain for a relatively larger rate of reception of said second set of said packets and providing a relatively larger filter gain for a relatively smaller rate of reception of said second set of said packets, and
         an output structured to estimate a difference between said one of the second times of said second clock and: (a) a corresponding one of the first times of said first clock of said first wireless node or (b) a corresponding one of the second times of said second clock of another one of said second wireless nodes,
      wherein said second processor cooperates with the output of said filter to adjust the second times of said second clock.

2. The system of claim 1 wherein said filter is a Kalman filter.

3. The system of claim 2 wherein said output of said Kalman filter is determined from:

$$XHAT(k)=XBAR(k)+L(k)[\mu\tilde{T}(k)-C(XBAR(k))],$$

wherein said XBAR(k) is the state of the Kalman filter following a process update at a sample k, said XHAT(k) is the state of the Kalman filter following a measurement update at the sample k, said L(k) is said filter gains, said µ$\tilde{T}$(k) is said difference between the third time and the fourth time, and said $C$=[1 0].

4. The system of claim 3 wherein when one of said second times is less than a corresponding one of said first times, said difference between the third time and the fourth time is positive; and wherein said second processor is structured to increase said second times of said second clock by said µ$\tilde{T}$(k).

5. The system of claim 1 wherein said first wireless node and said second wireless nodes transmit and receive said first and second sets of said packets, respectively, according to connections which form an acyclic directed graph.

6. The system of claim 5 wherein each of said first wireless node and said second wireless nodes includes a Synch Rank value; wherein the Synch Rank value of said first wireless node is less than the Synch Rank value of each of said second wireless nodes; wherein the Synch Rank value of one of said second wireless nodes that receives some of said first set of packets directly from said first wireless node is smaller than the Synch Rank value of another one of said second wireless nodes that receives some of said second set of packets, which are some of said first set of packets, indirectly from said first wireless node and through another one of said second wireless nodes.

7. The system of claim 6 wherein each of said second processors comprises a plurality of Sync Rank filters which are structured to decay with a predetermined time constant; and wherein when a first one of said second wireless nodes does not receive any of said second set of packets from a second one of said second wireless nodes with a Synch Rank value which is one less than the Synch Rank value of said first one of said second wireless nodes within a predetermined time, then the second processor of said first one of said second wireless nodes is structured to increment the Synch Rank value of said first one of said second wireless node.

8. The system of claim 6 wherein the Synch Rank value of said first wireless node is zero; wherein the minimum Synch Rank value of said second wireless nodes is one; and wherein the maximum Synch Rank value of said second wireless nodes is three.

9. The system of claim 6 wherein one of said second wireless nodes is structured to forward some of said second set of said packets to others of said second wireless nodes;
wherein each of said first and second sets of said packets includes the Synch Rank value of one of said first wireless node and said second wireless nodes, respectively; and wherein said second processor cooperates with said filter to adjust the second times of said second clock only when the Synch Rank value of said received one of the second set of said packets is less than the Synch Rank value of the corresponding one of said second wireless nodes that received said received one of the second set of said packets.

10. A system employing a plurality of test packets for assessing wireless communication performance, said system comprising:
a first master wireless node comprising:
a first clock including a plurality of first times,
a first wireless transceiver, and
a first processor cooperating with said first wireless transceiver to transmit and receive a first set of said test packets, said first processor being structured to transmit ones of said first set of said test packets at corresponding ones of the first times of said first clock; and
a plurality of second wireless nodes, each of said second wireless nodes comprising:
a second clock including a plurality of second times,
a second wireless transceiver structured to wirelessly communicate with the first wireless transceiver of said first master wireless node or with another one of said second wireless nodes,
a second processor cooperating with said second wireless transceiver to transmit and receive a second set of said test packets, said second processor being structured to transmit ones of said second set of said test packets at corresponding ones of the second times of said second clock, and
a filter comprising:
a plurality of filter gains,
an input representing a difference between a third time and a fourth time, said third time being when a received one of the second set of said test packets should have ideally been received by said second wireless transceiver, said third time being about one of the second times of said second clock, said fourth time being when said received one of the second set of said test packets was actually received by said second wireless transceiver as measured by said second clock,
a circuit structured to provide dynamic adjustment of said filter gains, said dynamic adjustment providing a relatively smaller filter gain for a relatively larger rate of reception of said second set of said packets and providing a relatively larger filter gain for a relatively smaller rate of reception of said second set of said packets, and
an output structured to estimate a difference between said one of the second times of said second clock and: (a) a corresponding one of the first times of said first clock of said first master wireless node or (b) a corresponding one of the second times of said second clock of another one of said second wireless nodes,
wherein said second processor cooperates with the output of said filter to adjust the second times of said second clock.

11. The system of claim 10 wherein said first and second processors are structured to store data from said first and second sets of said test packets, respectively, to assess wireless communication performance between corresponding ones of said first master wireless node and said second wireless nodes.

12. The system of claim 10 wherein said first and second processors of said first master wireless node and said second wireless nodes, respectively, are structured to operate with a packet success rate of said test packets of less than 10%.

13. The system of claim 12 wherein said packet success rate is about 1.0%.

14. The system of claim 10 wherein said first processor cooperates with said first wireless transceiver to transmit a test packet of the first set of said test packets to said second wireless nodes; wherein said filter is structured to synchronize said second clock with said first clock; and wherein each of said second processors is structured to synchronize with a common system test based upon said synchronized second clock.

15. The system of claim 14 wherein each of said second processors is further structured to synchronize with said common system test at least about once every 1000 of the test packets of said second set of test packets.

16. The system of claim 10 wherein each of said second processors receives a plurality of test packets of the second set of test packets before causing said filter to synchronize said second clock with said first clock.

17. The system of claim 10 wherein said filter is a Kalman filter.

18. A method employing a plurality of packets, said method comprising:
transmitting or receiving a first set of said packets by a first master wireless node;

employing a first clock including a plurality of first times at said first master wireless node;

transmitting or receiving a second set of said packets by a plurality of second wireless nodes;

employing a second clock including a plurality of second times at said second wireless nodes;

employing a filter including a plurality of filter gains at said second wireless nodes;

inputting an input representing a difference between a third time and a fourth time, said third time being when a received one of the second set of said packets should have ideally been received by one of said second wireless nodes, said third time being about one of the second times of said second clock, said fourth time being when said received one of the second set of said packets was actually received by said one of said second wireless nodes as measured by said second clock;

providing dynamic adjustment of said filter gains, said dynamic adjustment providing a relatively smaller filter gain for a relatively larger rate of reception of said second set of said packets and providing a relatively larger filter gain for a relatively smaller rate of reception of said second set of said packets;

outputting an output structured to estimate a difference between said one of the second times of said second clock and: (a) a corresponding one of the first times of said first clock of said first master wireless node or (b) a corresponding one of the second times of said second clock of another one of said second wireless nodes; and adjusting the second times of said second clock with said output.

19. The method of claim 18 further comprising storing data from said first and second sets of said packets, respectively, to assess wireless communication performance between corresponding ones of said first master wireless node and said second wireless nodes, respectively.

20. The method of claim 18 further comprising transmitting each packet of the first set of packets at a predetermined time with respect to a corresponding one of the first times of said first clock; and computing said third time based upon the corresponding one of the second times of the second clock and a length of said packet of the first set of packets.

21. The method of claim 18 further comprising determining said third time by embedding into each packet of the first set of packets the corresponding one of the first times of the first clock at the time of transmission.

22. The method of claim 18 further comprising transmitting packets of said first set of packets at corresponding times of the first times of said first clock; and synchronizing the second times of said second clock with the first times of said first clock, in order to execute a first schedule at the first master wireless node synchronous with a second schedule at one of the second wireless nodes.

* * * * *